(12) United States Patent
Hess et al.

(10) Patent No.: US 10,677,280 B2
(45) Date of Patent: Jun. 9, 2020

(54) SPRING-LOADED NUT PLATE

(71) Applicant: Enduralock, LLC., Overland Park, KS (US)

(72) Inventors: Harold Hess, Leawood, KS (US); Armando Perez, III, Los Angeles, CA (US); Zoltan Kalman Furu-Szekely, Cypress, TX (US); Igor Komsitsky, Los Angeles, CA (US)

(73) Assignee: Enduralock, LLC, Lenexa, KS (US)

( * ) Notice: Subject to any disclaimer, the term of this patent is extended or adjusted under 35 U.S.C. 154(b) by 147 days.

(21) Appl. No.: 15/875,913

(22) Filed: Jan. 19, 2018

(65) Prior Publication Data

US 2018/0252257 A1    Sep. 6, 2018

Related U.S. Application Data

(63) Continuation-in-part of application No. 15/678,927, filed on Aug. 16, 2017.

(60) Provisional application No. 62/465,997, filed on Mar. 2, 2017.

(51) Int. Cl.
*F16B 39/00* (2006.01)
*F16B 37/04* (2006.01)
*F16B 37/06* (2006.01)
*F16B 33/00* (2006.01)

(52) U.S. Cl.
CPC .......... *F16B 37/044* (2013.01); *F16B 33/002* (2013.01); *F16B 37/064* (2013.01)

(58) Field of Classification Search
CPC .............................. F16B 37/044; F16B 37/046

USPC .......................................... 411/103, 108, 109
See application file for complete search history.

(56) References Cited

U.S. PATENT DOCUMENTS

| | | | | |
|---|---|---|---|---|
| 2,353,252 A | * | 7/1944 | Leisure ................. | F16B 37/044 411/111 |
| 2,385,851 A | * | 10/1945 | Swanstrom ............ | F16B 39/34 411/103 |
| 2,737,222 A | * | 3/1956 | Becker ................. | F16B 5/0208 411/105 |
| 2,991,816 A | | 7/1961 | Harbison et al. | |
| 3,160,187 A | | 12/1964 | Zahodiakin | |
| 3,219,086 A | | 11/1965 | Zahodiakin | |
| 3,426,816 A | * | 2/1969 | McIntire, Jr. .......... | F16B 37/00 411/108 |

(Continued)

OTHER PUBLICATIONS

PCT International Search Report and Written Opinion, Application No. PCT/US2018/019325, dated May 2, 2018, 10 pps.

*Primary Examiner* — Gary W Estremsky
(74) *Attorney, Agent, or Firm* — Armstong Teasdale LLP

(57) ABSTRACT

A nut plate assembly includes a plate member comprising an aperture defined therethrough. The nut plate assembly also includes a shell member having a first end joined to the plate member and a second end opposite the first end. The nut plate assembly further includes a bias member disposed within the shell member and a nut comprising a shoulder portion configured to receive a portion of the bias member. The nut is disposed within the shell member and moveable between a first position proximate the shell member first end and a second position proximate the shell member second end. The bias member is configured to bias the nut toward one of the first position and the second position. The nut plate assembly also includes a retention member configured to retain the nut within the shell member.

20 Claims, 39 Drawing Sheets

(56) References Cited

U.S. PATENT DOCUMENTS

| | | |
|---|---|---|
| 3,695,324 A | 10/1972 | Gulistan |
| 4,191,236 A | 3/1980 | Duran |
| 4,227,561 A * | 10/1980 | Molina ................. F16B 37/044 411/103 |
| 4,692,075 A | 9/1987 | Metz |
| 4,863,326 A * | 9/1989 | Vickers ................. F16B 5/0266 411/105 |
| 4,875,816 A | 10/1989 | Peterson |
| 4,917,553 A * | 4/1990 | Muller ................. F16B 37/046 411/104 |
| 5,146,668 A | 9/1992 | Gulistan |
| 5,489,173 A * | 2/1996 | Hofle .................... F16B 37/046 411/85 |
| 5,716,178 A | 2/1998 | Vu |
| 5,730,540 A * | 3/1998 | Duran ................... F16B 5/0208 403/21 |
| 6,183,180 B1 * | 2/2001 | Copple ................. F16B 37/044 411/107 |
| 7,544,028 B2 * | 6/2009 | Tournier ............... F16B 37/046 411/121 |
| 7,698,798 B2 | 4/2010 | Toosky |
| 7,802,952 B2 | 9/2010 | Toosky et al. |
| 8,177,466 B2 | 5/2012 | Csik et al. |
| 8,277,158 B2 | 10/2012 | Csik et al. |
| 8,579,569 B2 | 11/2013 | Schendel |
| 8,647,035 B2 * | 2/2014 | Bakken ................. F16B 17/006 411/108 |
| 9,033,632 B2 | 5/2015 | Komsitsky et al. |
| 9,114,449 B2 | 8/2015 | Ross et al. |
| 9,140,290 B2 | 9/2015 | Damm |
| 9,360,039 B2 | 6/2016 | Endt et al. |
| 9,435,369 B2 | 9/2016 | Deck |
| 2003/0147715 A1 * | 8/2003 | Curley, Jr. ............ F16B 37/044 411/111 |

\* cited by examiner

SPRING-LOADED NUT PLATE

CROSS REFERENCE TO RELATED APPLICATIONS

This application is a continuation-in-part of U.S. patent application Ser. No. 15/678,927 filed Aug. 16, 2017 which claims priority to U.S. Provisional Patent Application No. 62/465,997 filed Mar. 2, 2017. The entirety of each of these applications is hereby incorporated by reference.

BACKGROUND

The field of the disclosure relates generally to nut plates, and more specifically to nut plates including a spring-loaded nut.

At least some known floating nut plates include a base or bottom plate with an opening and support a nut or similar fastener element that is captured on the base by a retainer or cage component. Such nut plates facilitate holding components, for example panels, together when a fastener is threadably engaged with the nut plate and tightened, while still enabling some movement between the components. In such known nut plates, the nut receives a fastener, such as a bolt, screw, or other threaded component element passed through an opening in the components and threaded into the nut. The opening in the component may be sized to enable the nut and fastener to move laterally to accommodate some movement between the fastened components.

At least some known floating nut plates may be used in the aerospace industry. In aerospace applications, the types and numbers of fasteners for a panel assembly can be significant. Some panel fasteners for a particular panel assembly may have different lengths, while otherwise looking similar to other panel fasteners. When the panel assembly is removed, a user may typically place all the panel fasteners in a separate location to keep from misplacing the fasteners. However, when replacing the panel assembly, the user may inadvertently use an incorrect length fastener for a particular panel fastener location. This can lead to an improperly attached panel assembly.

BRIEF DESCRIPTION

In one aspect, a nut plate assembly is provided. The nut plate assembly includes a plate member comprising an aperture defined therethrough. The nut plate assembly also includes a shell member having a first end joined to the plate member and a second end opposite the first end. The nut plate assembly further includes a bias member disposed within the shell member, and a nut including a shoulder portion configured to receive a portion of the bias member. The nut is disposed within the shell member and moveable between a first position proximate the shell member first end and a second position proximate the shell member second end. The bias member is configured to bias the nut toward one of the first position and the second position. The nut plate assembly also includes a retention member configured to retain the nut within the shell member.

In another aspect, a fastener assembly is provided. The fastener assembly includes a nut plate assembly adapted for mounting to a mounting structure. The nut plate assembly includes a plate member including an aperture defined therethrough. The nut plate assembly also includes a shell member having a first end joined to the plate member and a second end opposite the first end. The nut plate assembly further includes a bias member disposed within the shell member, and a nut including a shoulder portion configured to receive a portion of the bias member. The nut is disposed within the shell member and moveable between a first position proximate the shell member first end and a second position proximate the shell member second end. The bias member is configured to bias the nut toward one of the first position and the second position. The fastener assembly also includes a fastener configured to mount in an aperture formed in a panel member. The fastener is threadably engageable with the nut for coupling the panel member to the mounting structure.

In yet another aspect, a method of assembling a nut plate assembly is provided. The method includes positioning a bias member within a shell member. The shell member has a first end joined to a plate member and a second end opposite the first end. The plate member includes an aperture defined therethrough. The method also includes positioning a nut within the shell member. The nut includes a shoulder portion configured to receive a portion of the bias member. The nut is moveable between a first position proximate the shell member first end and a second position proximate the shell member second end. The bias member is configured to bias the nut toward one of the first position and the second position. The method further includes coupling a retention member to at least one of the shell member and the plate member to retain the nut within the shell member.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
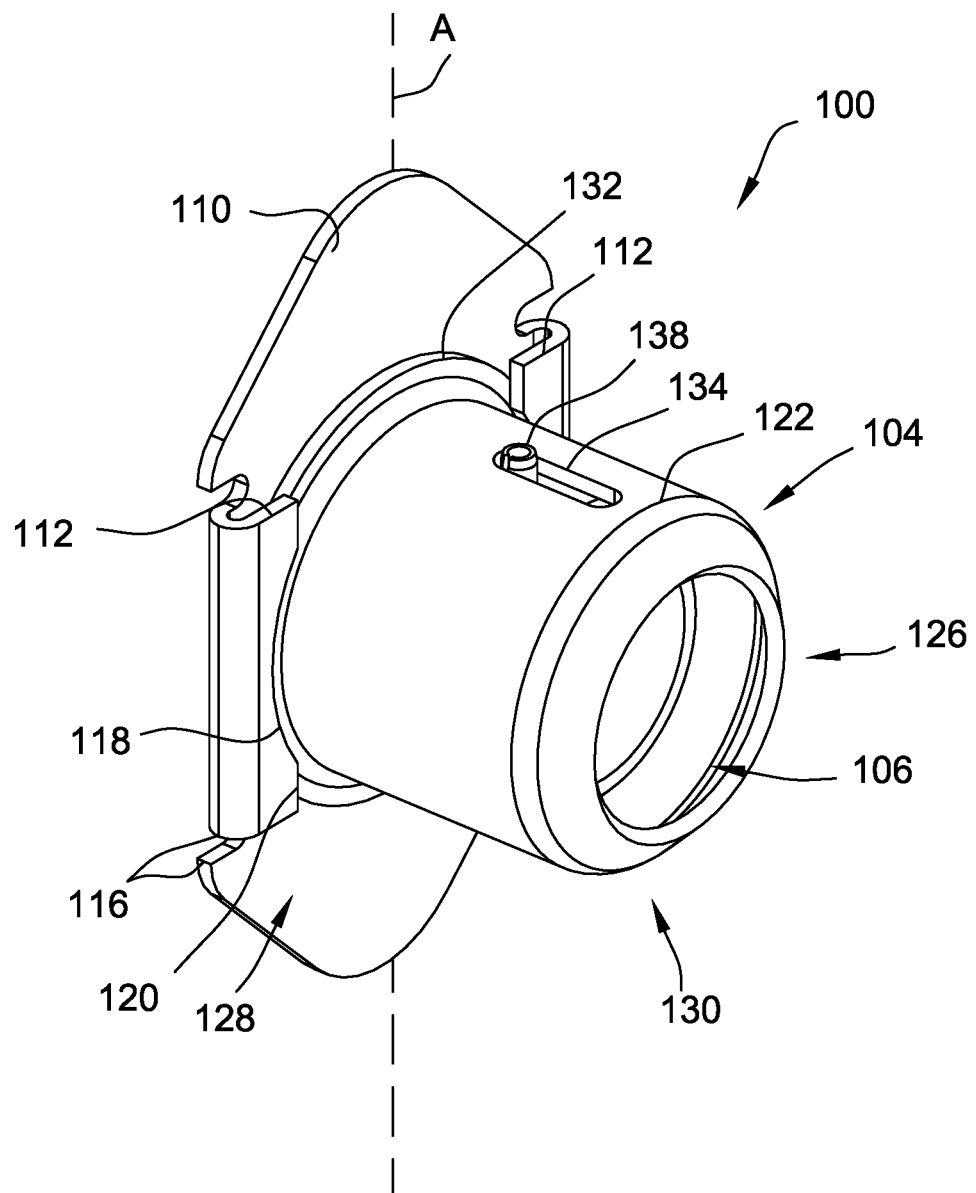
FIG. 1 is a perspective view of a spring-loaded nut plate assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Relative descriptors used herein such as upward, downward, left, right, up, down, length, height, width, thickness, and the like are with reference to the figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed fastener assemblies. Additionally, the shapes and sizes of components are also exemplary and can be altered without materially affecting or limiting the disclosed technology.

The nut plate assemblies described herein overcome many of the problems associated with nut plate assemblies. In general, nut plate assemblies are used to fixedly connect panels to structures in a variety of applications such as, without limitation, aerospace applications, industrial applications, and building applications, where access to both sides of the nut plate assembly is limited or restricted. Among other features and benefits, the disclosed nut plate assemblies facilitate one or more of the use of captive panel fasteners having varying lengths, quick and easy installation and/or removal of panel fasteners, and/or single end access for blind fastening applications. The advantages, and other features of the technology disclosed herein, will become more readily apparent to those having ordinary skill in the art from the following detailed description of certain preferred embodiments taken in conjunction with the drawings.

Figure 2:
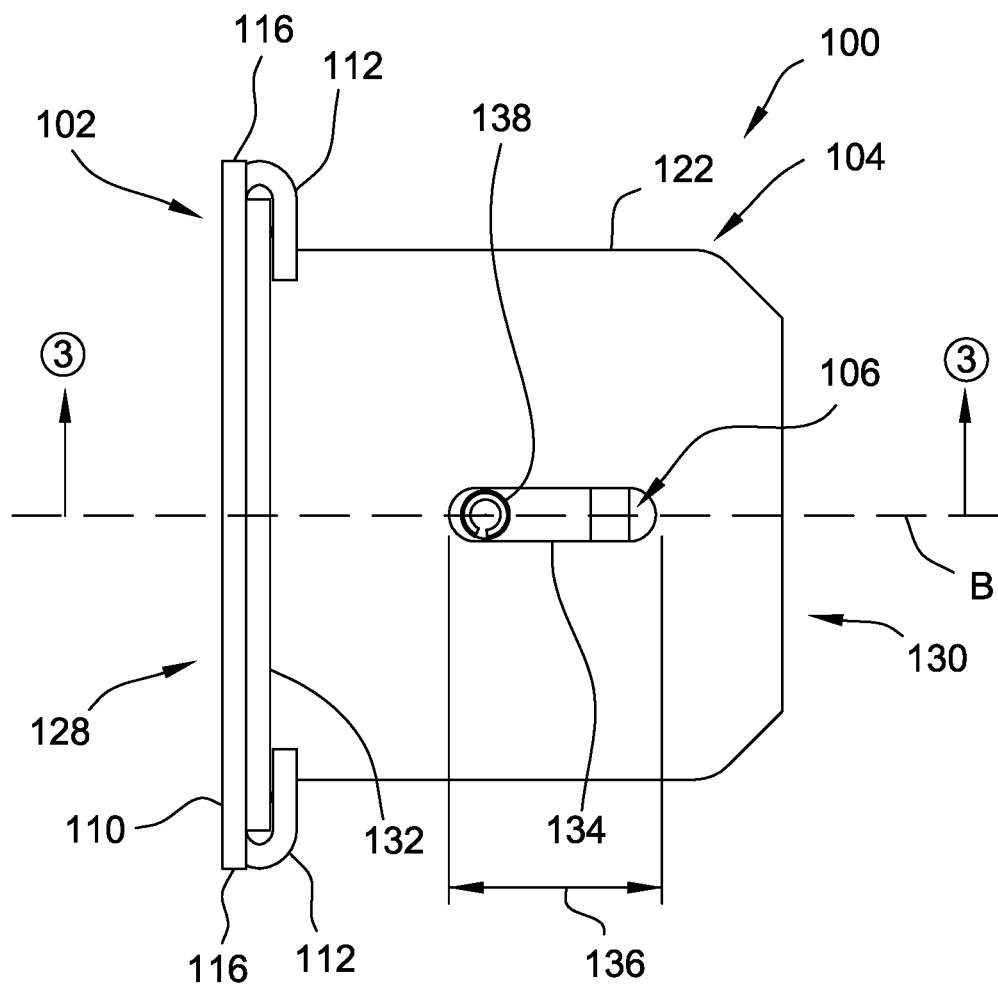
FIG. 2 is a top view of the nut plate assembly shown in FIG. 1.
Figure 3:
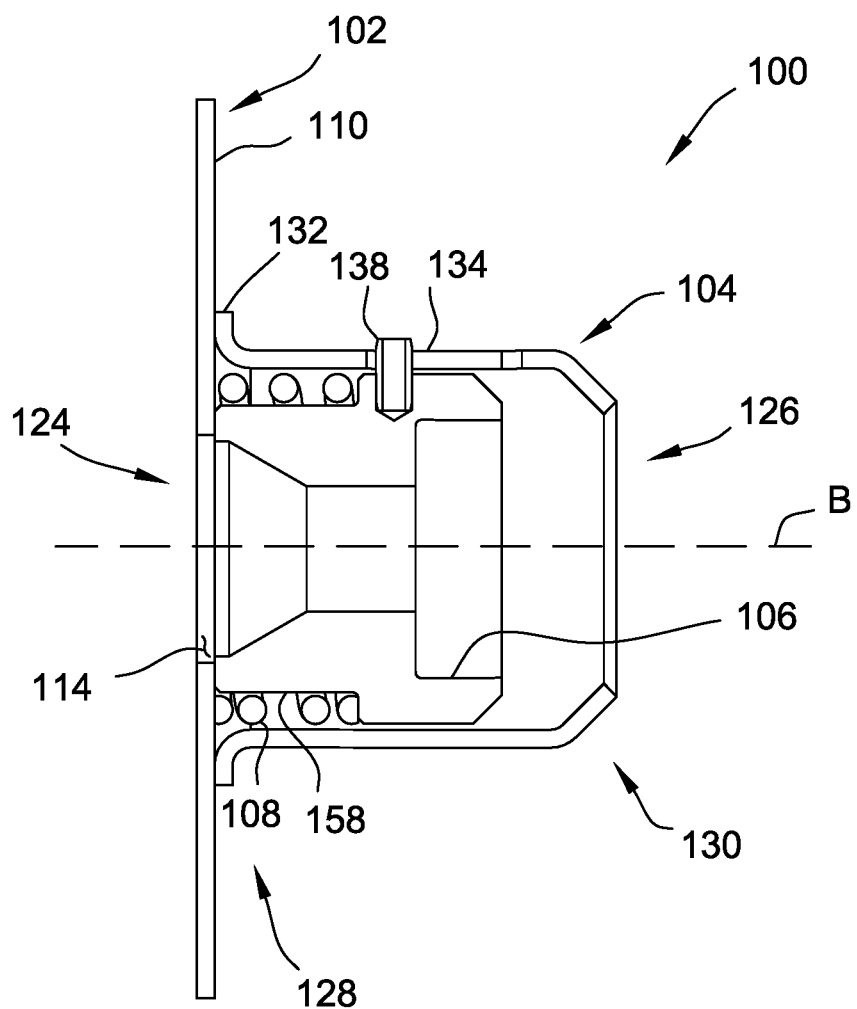
FIG. 3 is a cross-sectional view of the nut plate assembly shown in FIG. 2, taken about line 3-3 shown in FIG. 2.

FIG. 1 is a perspective view of a spring-loaded nut plate assembly 100. FIG. 2 is a top view of nut plate assembly 100. FIG. 3 is a cross-sectional view of nut plate assembly 100, taken about line 3-3 shown in FIG. 2. In the exemplary embodiment, nut plate assembly 100 includes a plate member 102, a shell member 104, a floating nut, broadly a nut, 106, and a bias member 108. Plate member 102 includes a wall portion 110 and a plurality of retention tabs 112 integrally formed with wall portion 110. Wall portion 110 includes an aperture 114 defined therethrough for receiving a fastener. Retention tabs 112, prior to coupling shell member 104 to plate member 102, lie in a plane of wall portion 110. In another embodiment, retention tabs 112 may be folded or bent perpendicular to wall portion 110. During assembly of nut plate assembly 100, retention tabs 112 are curled or bent along a respective edge 116 of plate member 102 to facilitate coupling shell member 104 to plate member 102. Each retention tab 112 has a semi-circular cutout 118 defined on an edge 120 of each retention tab 112.

In the exemplary embodiment, shell member 104 includes a substantially cylindrical wall 122 that defines a first opening 124 at a first end 128 and a second opening 126 at a second end 130 of shell member 104. First opening 124 and second opening 126 are generally concentric with each other. Shell member 104 includes a flange 132 formed at first end 128. At second end 130, cylindrical wall 122 tapers radially inward, e.g., by a swaging process, to facilitate retaining floating nut 106 within shell member 104 when shell member 104 is coupled to plate member 102.

Also, in the exemplary embodiment, floating nut 106 is disposed within shell member 104 and is moveable relative to cylindrical wall 122. For example, floating nut 106 is moveable along a central axis of shell member 104 between a first position and a second position. In the first position, floating nut 106 is proximate first end 128. In the second position, floating nut 106 is proximate second end 130. In alternative embodiments, floating nut 106 is moveable in any manner that enables nut plate assembly 100 to operate as described herein.

In the exemplary embodiment, shell member 104 includes a longitudinal slot 134 defined through cylindrical wall 122. Longitudinal slot 134 extends substantially axially along a centerline "B" of shell member 104 a predetermined length 136. Longitudinal slot 134 is sized and shaped to receive an anti-rotation pin 138 therethrough. In particular, anti-rotation pin 138 is coupled to floating nut 106 and extends through longitudinal slot 134 to facilitate preventing rotation of floating nut 106 while enabling axial movement during use of nut plate assembly 100. In the exemplary embodiment, anti-rotation pin 138 is a spring pin. Alternatively, anti-rotation pin 138 may be any type of anti-rotation mechanism that secures floating nut 106 as described herein, including for example, and without limitation, a dowel pin and/or a threaded fastener.

In the exemplary embodiment, bias member 108 is positioned within shell member 104 and between plate member 102 and floating nut 106. As such, bias member 108 facilitates biasing floating nut 106 axially away from plate member 102 and towards the second position. During use of nut plate assembly 100, bias member 108 facilitates pulling the attaching structure together as a fastener (not shown in FIGS. 1-3) is coupled with floating nut 106. Bias member 108 may function as a damping element and facilitates providing a pre-load force to a fastened joint. In the exemplary embodiment, bias member 108 is a compression spring. Alternatively, bias member 108 may be any type of bias or force provider that enables nut plate assembly 100 to function as described herein. The pre-load force on floating nut 106 may be adjusted by varying the wire diameter and spring length of bias member 108. In the exemplary embodiment, the wire diameter and spring length of bias member 108 is selected to provide the necessary pre-load required for operation of nut plate assembly 100, while maintaining bias member 108 in an axial resiliency range.

Figure 4:
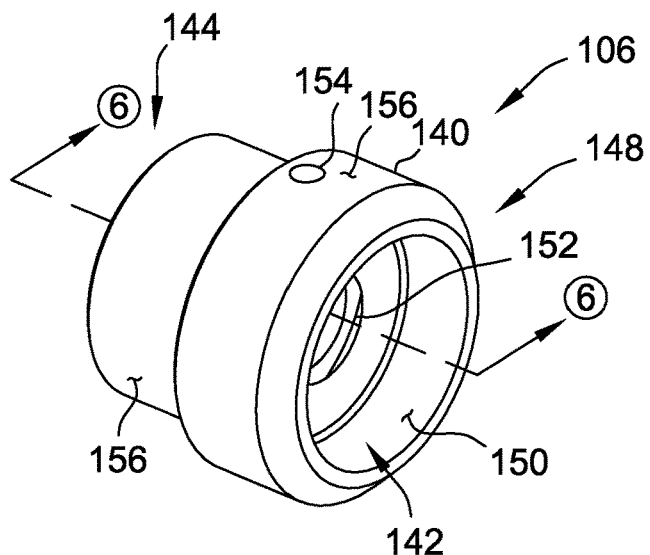
FIG. 4 is a perspective view of a floating nut for use with nut plate assembly shown in FIG. 1.
Figure 5:
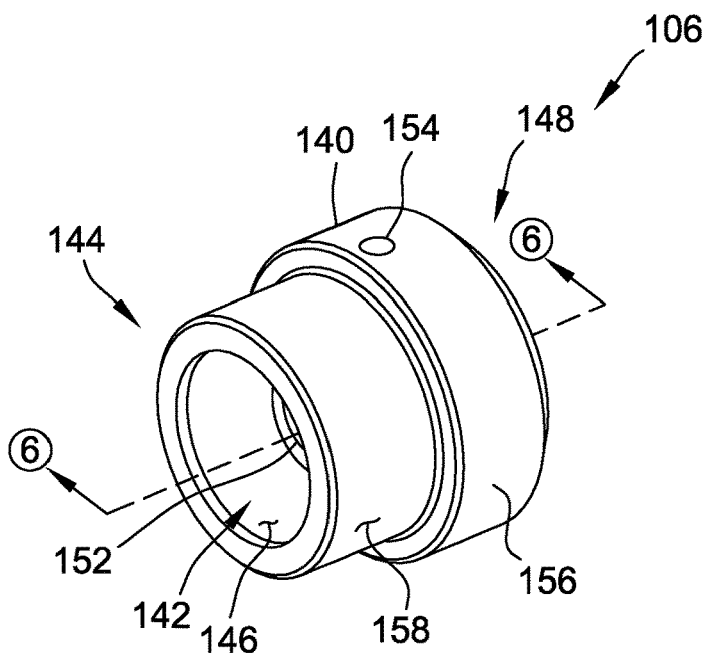
FIG. 5 is another perspective view of the floating nut shown in FIG. 4.
Figure 6:
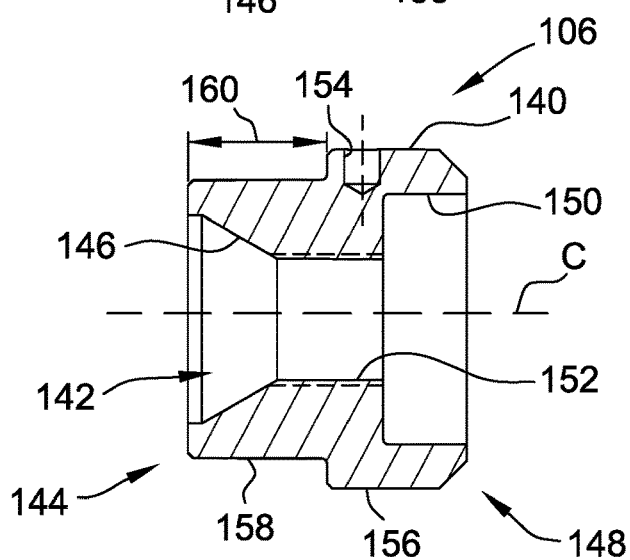
FIG. 6 is a cross-sectional view of the floating nut shown in FIG. 4, taken about line 6-6 shown in FIGS. 4 and 5.

FIG. 4 is a perspective view of floating nut 106 for use with nut plate assembly 100 (shown in FIG. 1). FIG. 5 is another perspective view of floating nut 106. FIG. 6 is a cross-sectional view of floating nut 106 taken about line 6-6 shown in FIGS. 4 and 5. In the exemplary embodiment, floating nut 106 has a substantially cylindrical body 140 that defines a bore 142 therethrough. At a first end 144 of cylindrical body 140, bore 142 includes a tapered portion 146 configured to facilitate aligning a fastener (not shown in FIGS. 4-6) with cylindrical body 140. At a second end 148 of cylindrical body 140, bore 142 includes a counter bored portion 150. Bore 142 includes a female threaded portion 152 extending between tapered portion 146 and counter bored portion 150 for threadably coupling to a fastener during use of nut plate assembly 100. In the exemplary embodiment, counter bored portion 150 functions as a way to control a length of female threaded portion 152 to facilitate maintaining a thread engagement length to about one times the thread diameter, while allowing the fastener to extend through female threaded portion 152. In addition, counter bored portion 150 facilitates fabricating cylindrical body 140 with a shoulder portion 158 having a length sufficient to prevent over-stressing and/or damaging bias member 108 while maintaining a thread engagement length to about one times the thread diameter, as described further herein.

Floating nut 106 includes a hole 154 defined in an outer surface 156 of cylindrical body 140. In particular, hole 154 is formed in outer surface 156 substantially perpendicular to centerline "C" of cylindrical body 140. In the exemplary embodiment, hole 154 extends a predetermined depth into cylindrical body 140, but does not extend through to bore 142. In alternative embodiments, hole 154 may extend any depth into cylindrical body 140, including, for example, entirely through cylindrical body 140. Hole 154 is sized and shaped to receive anti-rotation pin 138 therein. In particular, hole 154 is sized to form an interference fit with anti-rotation pin 138. As used herein, the phrase "interference fit" means a value of tightness between anti-rotation pin 138 and hole 154, i.e., an amount of radial clearance between the components. A negative amount of clearance is commonly referred to as a press fit, where the magnitude of interference determines whether the fit is a light interference fit or interference fit. A small amount of positive clearance is referred to as a loose or sliding fit. Alternatively, anti-rotation pin 138 may be coupled to cylindrical body 140 using any suitable fastening technique that enables nut plate assembly 100 to function as described herein. In the exemplary embodiment, an upper portion of anti-rotation pin 138 extends through longitudinal slot 134 to facilitate preventing rotation of floating nut 106 while enabling axial movement during use of nut plate assembly 100.

In the exemplary embodiment, floating nut 106 includes shoulder portion 158 extending from first end 144 axially along cylindrical body 140 a predetermined distance 160 that facilitates preventing over-stressing and/or damaging bias member 108 when bias member 108 is compressed, while enabling bias member 108 to urge cylindrical body 140 away from plate member 102 when extended. Shoulder portion 158 has a diameter that is smaller than the diameter of outer surface 156 of cylindrical body 140. In particular, shoulder portion 158 has a diameter configured to enable bias member 108 to slide onto shoulder portion 158, as shown in FIG. 3. Shoulder portion 158 enables bias member 108 to apply an axial force to cylindrical body 140 to urge cylindrical body 140 away from plate member 102, as described herein.

To assemble nut plate assembly 100, floating nut 106 is placed into shell member 104. Hole 154 of floating nut 106 is aligned with longitudinal slot 134. Anti-rotation pin 138 is press fit into hole 154 such that an end of anti-rotation pin 138 extends through longitudinal slot 134. Bias member 108 is placed about shoulder portion 158 of floating nut 106. First opening 124 of shell member 104 is substantially aligned with aperture 114 of plate member 102. Shell member 104 is pressed against plate member 102, thereby compressing bias member 108 within shell member 104. Retention tabs 112 are then curled or bent over flange 132 of shell member 104 to axially retain shell member 104 to plate member 102. As shown in FIG. 1, semi-circular cutouts 118 have a curvature that is greater than a diameter of cylindrical wall 122 of shell member 104, but less than a diameter of flange 132. This facilitates enabling shell member 104 to move a small amount along wall portion 110, while remaining in face to face contact with wall portion 110. As such, a fastener (not shown in FIG. 1) may be aligned with floating nut 106, which is retained in shell member 104, even if there is minor misalignment with the fastener and aperture 114 of plate member 102.

In the exemplary embodiment, nut plate assembly 100 is configured to retain both floating nut 106 and bias member 108 within shell member 104, which allows for nut plate assembly 100 to be used as an inseparable assembly. In addition, during use, nut plate assembly 100 requires no access from the nut side of nut plate assembly 100, which is advantageous for use with panels and other structure where access to both sides of nut plate assembly 100 is limited.

Figure 7:
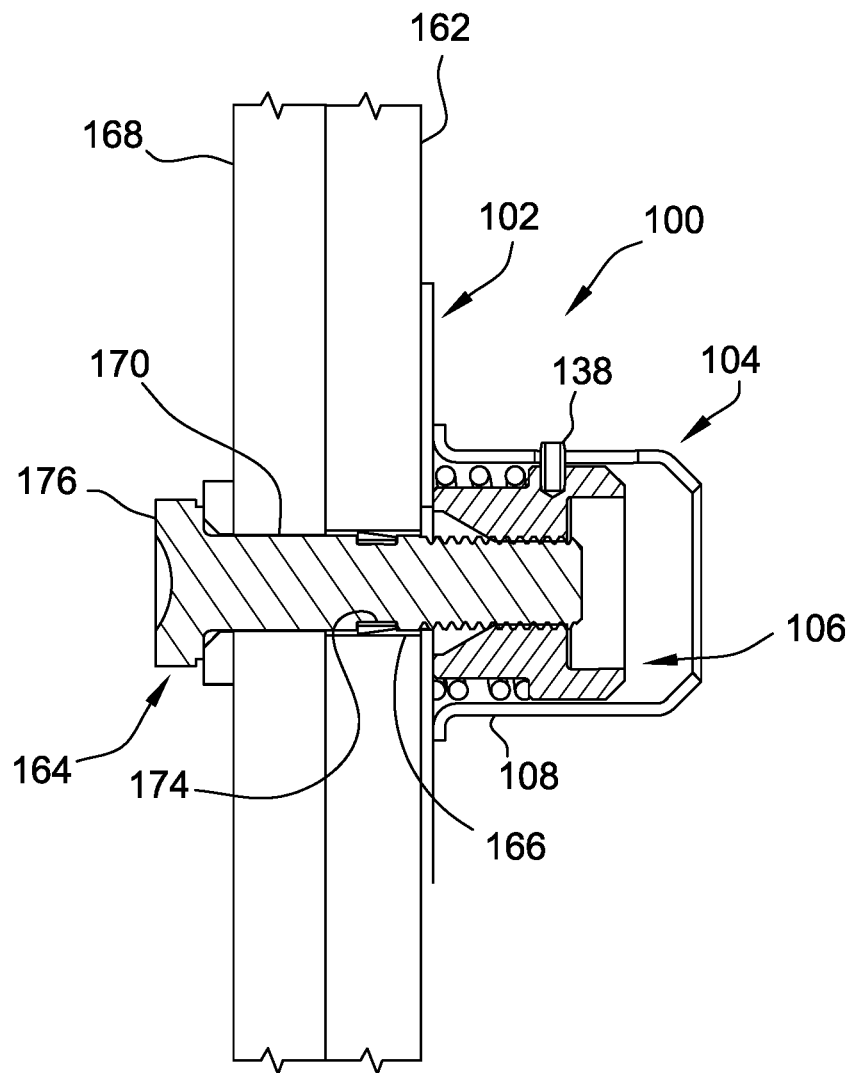
FIG. 7 is a cross-sectional view of the nut plate assembly shown in FIG. 1, coupled to a mounting structure and including a captive fastener.

FIG. 7 is a cross-sectional view of installed nut plate assembly 100 coupled to mounting structure 162, including a captive fastener 164. In the exemplary embodiment, nut plate assembly 100 is coupled to mounting structure 162 by, for example, and without limitation, adhesive bonding. Mounting structure 162 includes an aperture 166 defined therethrough and sized to receive at least a portion of fastener 164. Fastener 164 also extends through a panel 168 via aperture 170. In the exemplary embodiment, aperture 170 has a diameter smaller than the diameter of aperture 166. This facilitates capturing fastener 164 in panel 168 by a locking mechanism 172. In particular, fastener 164 includes locking mechanism 172. In the exemplary embodiment, locking mechanism 172 is a lock ring. In alternative embodiments, locking mechanism 172 includes, for example, and without limitation, a retaining ring, an E-clip, a spring plunger, and/or any mechanism configured to facilitate capturing fastener 164 in panel 168. In the exemplary embodiment, locking mechanism 172 is coupled to a groove 174 formed in fastener 164 a predetermined distance from a head 176 of fastener 164. For example, groove 174 may be formed at a distance that enables panel 168 to be positioned between head 176 and locking mechanism 172, thereby facilitating capturing fastener 164 in panel 168. As fastener 164 is inserted through aperture 170, locking mechanism 172 collapses into groove 174. After locking mechanism 172 passes through aperture 170, it expands radially to its original diameter to prevent fastener 164 from being pulled back through panel 168.

In the exemplary embodiment, fastener 164 is a panel bolt having a hexagonal head 176. Alternatively, fastener 164 is any type of fastener having head 176 taking any shape or form, including for example, and without limitation, a spline head, a flat head, a socket cap head, and a pan head. In some embodiments, fastener 164 is a locking fastener, including one or more components configured to lock fastener 164 against rotation relative to panel 168.

Panel 168, with fastener 164, is introduced to mounting structure 162 with nut plate assembly 100 for assembly. Fastener 164 is aligned with floating nut 106 and panel 168 is pushed toward mounting structure 162 until fastener 164 contacts female threaded portion 152 of floating nut 106. Fastener 164 is threadably engaged with floating nut 106. Floating nut 106 is drawn toward fastener 164 and compresses bias member 108. The spring rate of bias member 108 can be adjusted by increasing or decreasing the wire diameter and/or the length of bias member 108, as described herein. Further, in some embodiments, the force of bias member 108 against floating nut 106 may be adjusted by increasing or decreasing an amount of torque applied to fastener 164. For example, as the torque applied to fastener 164 is increased, bias member 108 is compressed and increases the force against floating nut 106 until floating nut 106 is seated against wall portion 110. In addition, as the torque applied to fastener 164 is decreased, bias member 108 is decompressed and decreases the force against floating nut 106 until floating nut 106 is biased against second end 130 of shell member 104.

Figure 8:
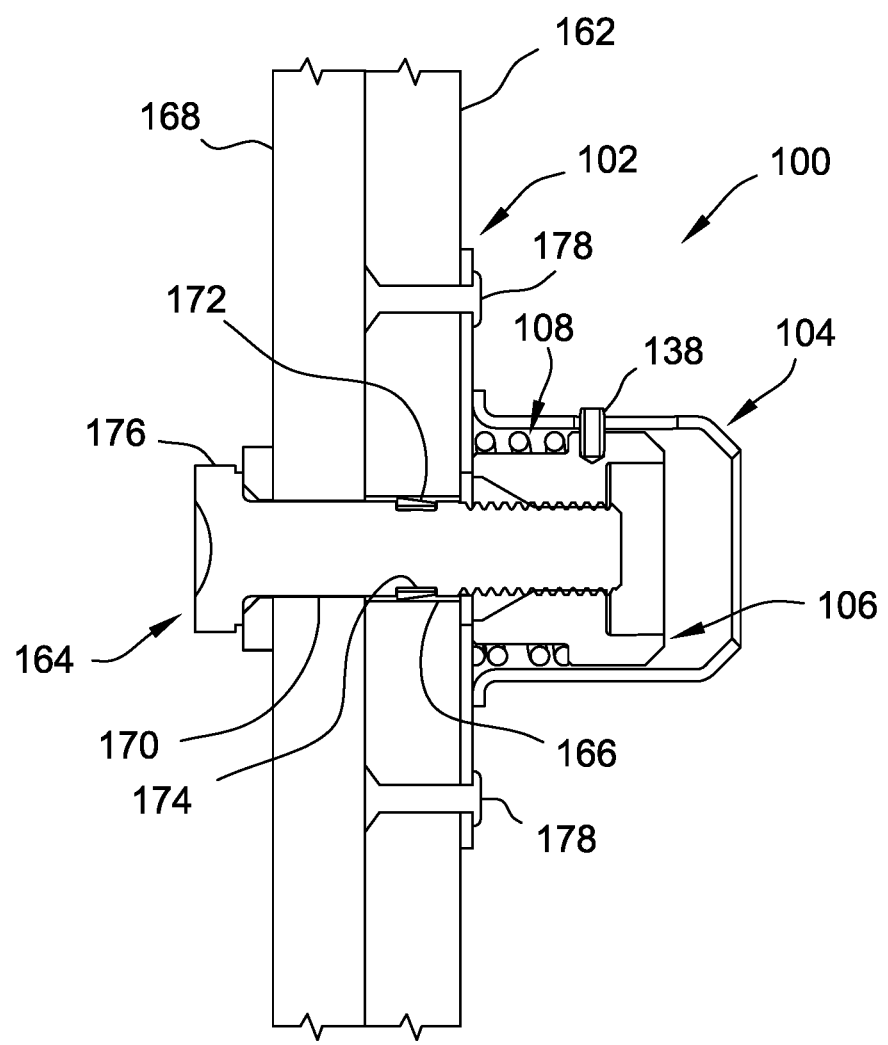
FIG. 8 is a cross-sectional view of another embodiment of the nut plate assembly shown in FIG. 1, coupled to the mounting structure and including the captive fastener assembly shown in FIG. 7.

FIG. 8 is a cross-sectional view of another embodiment of installed nut plate assembly 100 coupled to mounting structure 162, and including captive fastener 164. In the exemplary embodiment, nut plate assembly 100 is mechanically coupled to mounting structure 162 by fasteners 178. In the exemplary embodiment, fasteners 178 include, for example, and without limitation, nut and bolt combinations, sheet metal fasteners, rivets, and the like.

Figure 9:
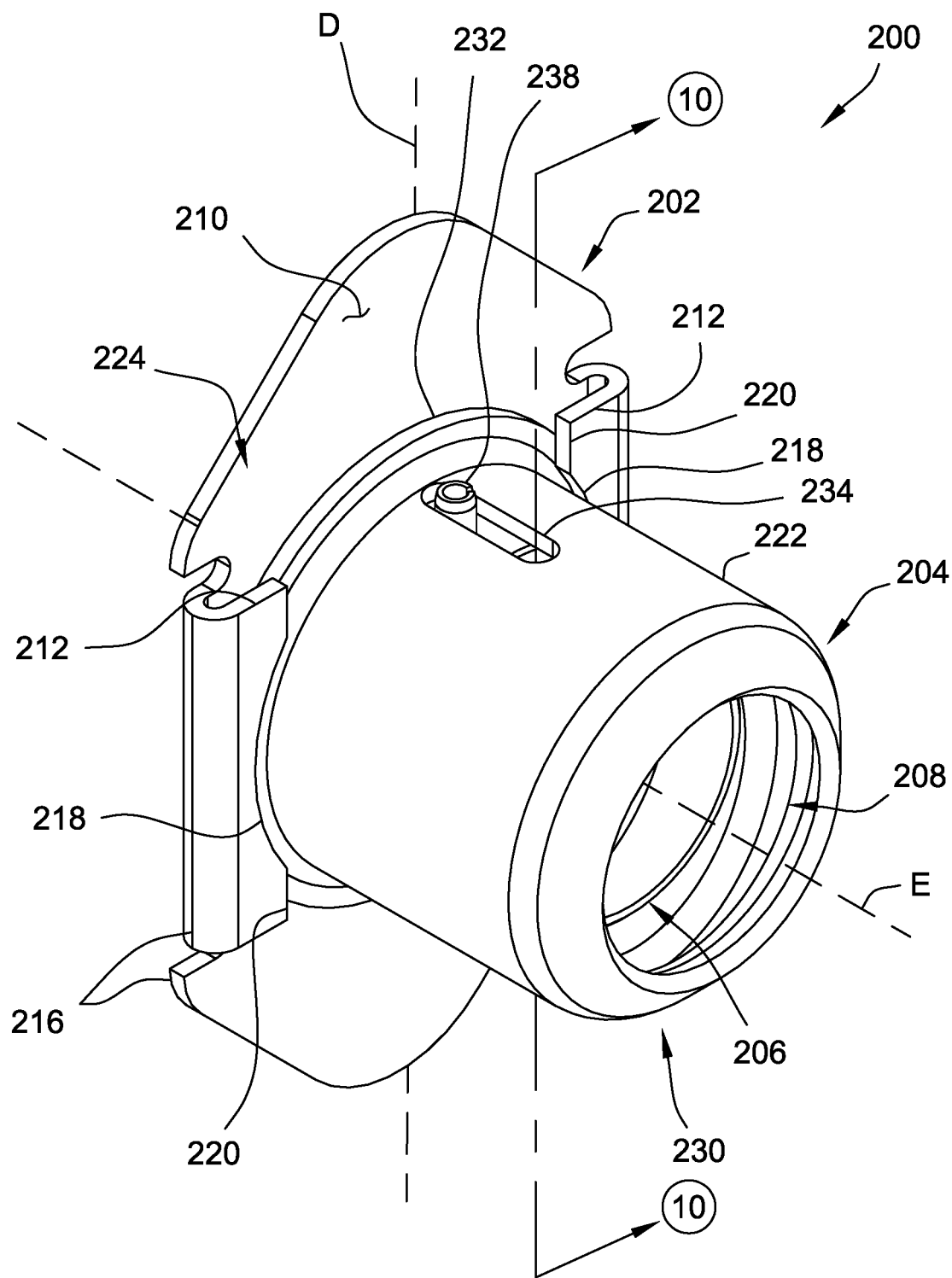
FIG. 9 is a perspective view of another spring-loaded nut plate assembly.
Figure 10:
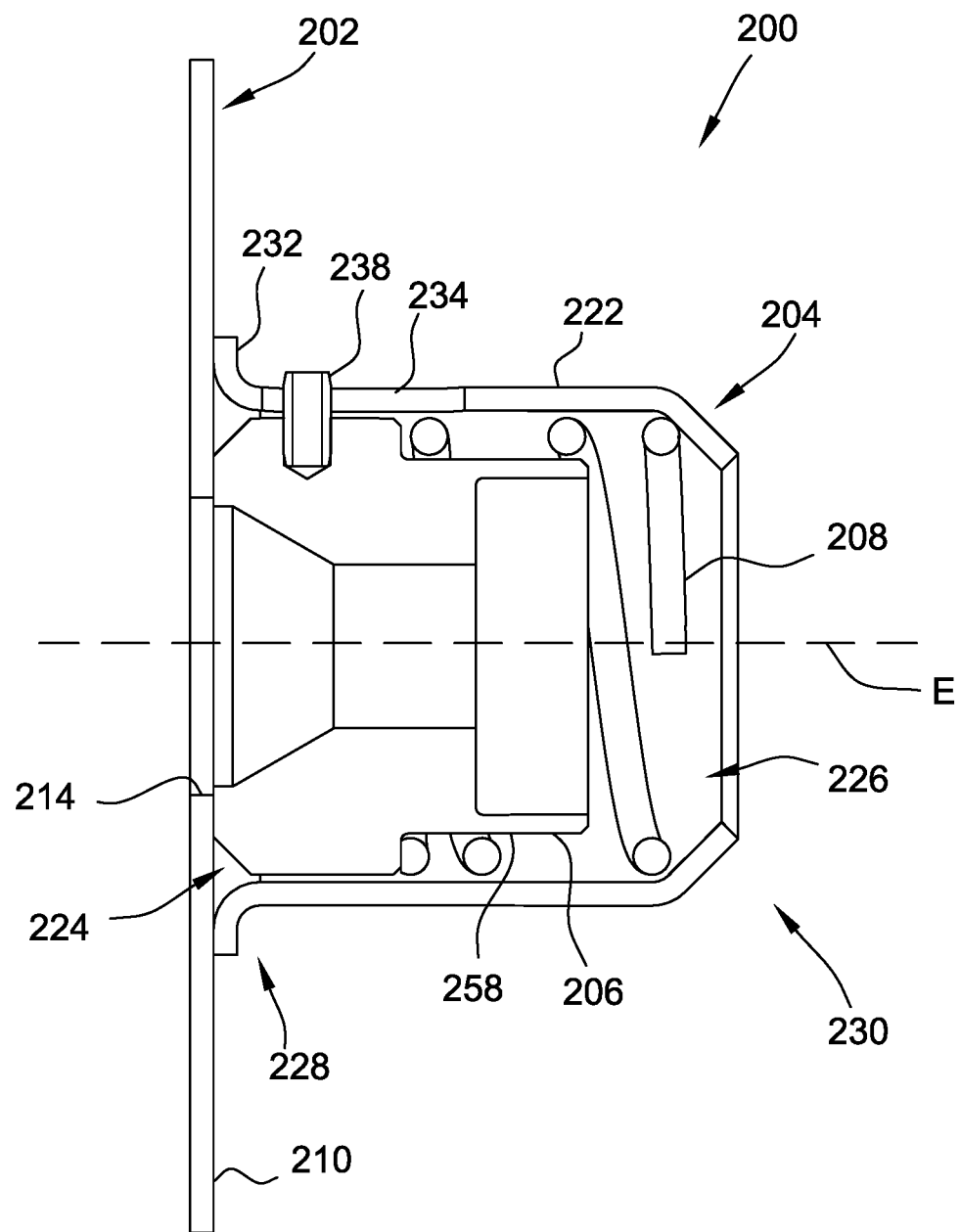
FIG. 10 is a cross-sectional view of the nut plate assembly shown in FIG. 9, taken about line 10-10 shown in FIG. 9.

FIG. 9 is a perspective view of a spring-loaded nut plate assembly 200. FIG. 10 is a cross-sectional view of nut plate assembly 200, taken about line 10-10 shown in FIG. 9. In the exemplary embodiment, nut plate assembly 200 is similar to nut plate assembly 100 (shown in FIG. 1) and includes a plate member 202, a shell member 204, a floating nut 206, and a bias member 208. Plate member 202 includes a wall portion 210 and a plurality of retention tabs 212 integrally formed with wall portion 210. Wall portion 210 includes an aperture 214 defined therethrough for receiving a fastener (not shown in FIGS. 9 and 10). Retention tabs 212, prior to coupling shell member 204 to plate member 202, lie in a plane of wall portion 210. In another embodiment, retention tabs 212 may be folded or bent perpendicular to wall portion 210. During assembly of nut plate assembly 200, retention tabs 212 are curled or bent along a respective edge 216 of plate member 202 to facilitate coupling shell member 204 to plate member 202. Each retention tab 212 has a semi-circular cutout 218 defined on an edge 220 of each retention tab 212.

In the exemplary embodiment, shell member 204 includes a substantially cylindrical wall 222 that defines a first opening 224 at a first end 228 and a second opening 226 at a second end 230 of shell member 204. First opening 224 and second opening 226 are generally concentric with each other. Shell member 204 includes a flange 232 formed at first end 228. At second end 230, cylindrical wall 222 tapers radially inward, e.g., by a swaging process, to facilitate retaining floating nut 206 within shell member 204 when shell member 204 is coupled to plate member 202.

Also, in the exemplary embodiment, floating nut 206 is disposed within shell member 204 and is moveable relative to cylindrical wall 222. For example, floating nut 206 is moveable along a central axis of shell member 204 between a first position and a second position. In the first position, floating nut 206 is proximate first end 228. In the second position, floating nut 206 is proximate second end 230. In alternative embodiments, floating nut 206 is moveable in any manner that enables nut plate assembly 200 to operate as described herein.

In the exemplary embodiment, shell member 204 includes a longitudinal slot 234 defined through cylindrical wall 222. Longitudinal slot 234 extends substantially axially along a centerline "E" of shell member 204 a predetermined length. Longitudinal slot 234 is sized and shaped to receive an anti-rotation pin 238 therethrough. In particular, anti-rotation pin 238 is coupled to floating nut 206 and extends through longitudinal slot 234 to facilitate preventing rotation of floating nut 206 while enabling axial movement during use of nut plate assembly 200. In the exemplary embodiment, anti-rotation pin 238 is a spring pin. Alternatively, anti-rotation pin 238 may be any type of anti-rotation mechanism that secures floating nut 206 as described herein, including for example, and without limitation, a dowel pin and/or a threaded fastener.

In the exemplary embodiment, bias member 208 is positioned within shell member 204 and between floating nut 206 and second end 230 of shell member 204. As such, bias member 208 facilitates biasing floating nut 206 axially toward plate member 202 and towards the first position. During use of nut plate assembly 200, bias member 208 facilitates pushing the attaching structure apart as a fastener (not shown in FIGS. 9 and 10) is coupled with floating nut 206. Bias member 208 may function as a damping element. In the exemplary embodiment, bias member 208 is a compression spring. Alternatively, bias member 208 may be any type of bias or force provider that enables nut plate assembly 200 to function as described herein. The force on floating nut 206 may be adjusted by varying the wire diameter and spring length of bias member 208. In the exemplary embodiment, the wire diameter and spring length of bias member 208 is selected to provide a desired bias force for operation of nut plate assembly 200, while maintaining bias member 208 in an axial resiliency range.

Figure 11:
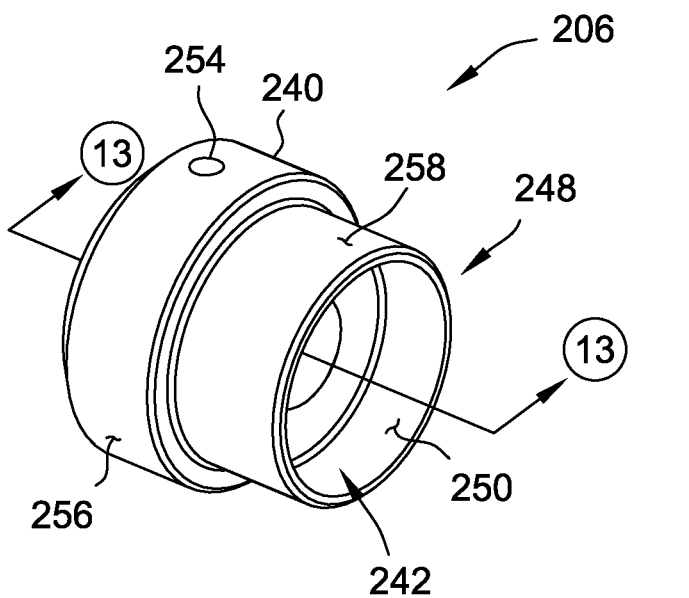
FIG. 11 is a perspective view of a floating nut for use with the nut plate assembly shown in FIG. 9.
Figure 12:
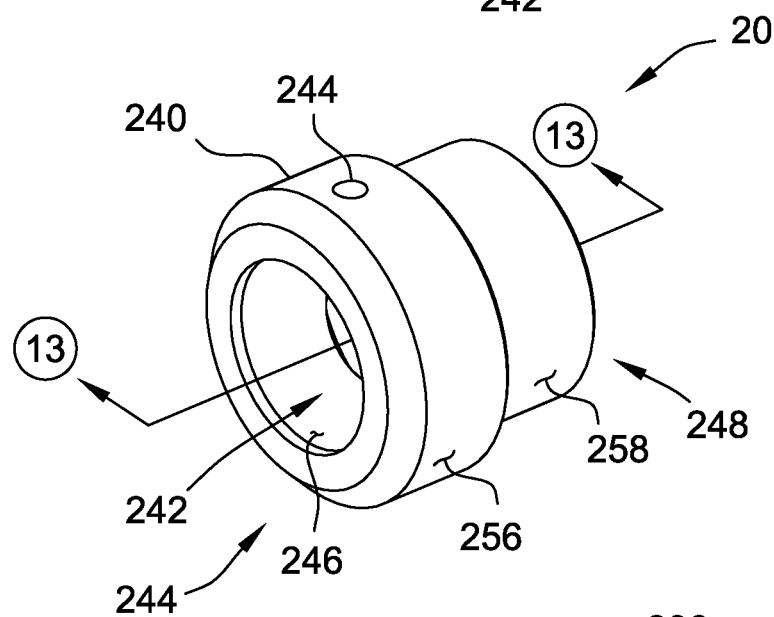
FIG. 12 is another perspective view of the floating nut shown in FIG. 11.
Figure 13:
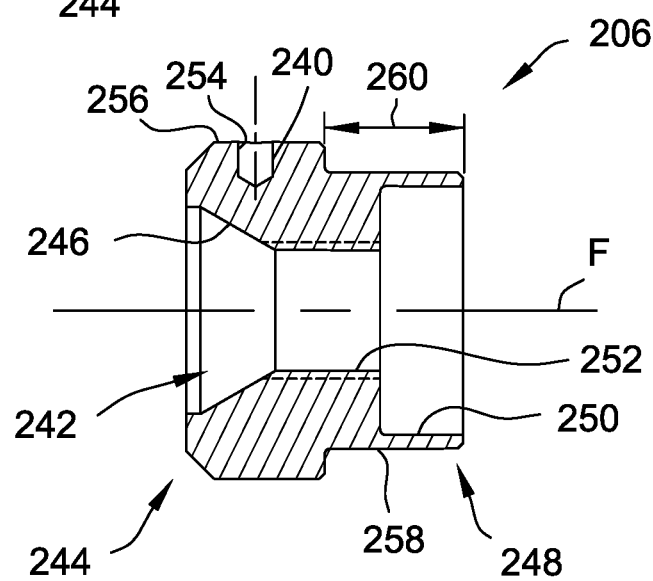
FIG. 13 is a cross-sectional view of the floating nut shown in FIG. 11, taken about line 13-13 shown in FIGS. 11 and 12.

FIG. 11 is a perspective view of floating nut 206 for use with nut plate assembly 200 (shown in FIG. 9). FIG. 12 is another perspective view of floating nut 206. FIG. 13 is a cross-sectional view of floating nut 206 taken about line 13-13 shown in FIGS. 11 and 12. In the exemplary embodiment, floating nut 206 has a substantially cylindrical body 240 that defines a bore 242 therethrough. At a first end 244 of cylindrical body 240, bore 242 includes a tapered portion 246 configured to facilitate aligning a fastener (not shown in FIGS. 11-13) with cylindrical body 240. At a second end 248 of cylindrical body 240, bore 242 includes a counter bored portion 250. Bore 242 includes a female threaded portion 252 extending between tapered portion 246 and counter bored portion 250 for threadably coupling to a fastener during use of nut plate assembly 200. In the exemplary embodiment, counter bored portion 250 functions as a way to control a length of female threaded portion 252 to facilitate maintaining a thread engagement length to about one times the thread diameter, while allowing the fastener to extend through female threaded portion 252. In addition, counter bored portion 250 facilitates fabricating cylindrical body 240 with a shoulder portion 258 having a length sufficient to prevent over-stressing and/or damaging bias member 208 while maintaining a thread engagement length to about one times the thread diameter, as described further herein.

Floating nut 206 includes a hole 254 defined in an outer surface 256 of cylindrical body 240. In particular, hole 254 is formed in outer surface 256 substantially perpendicular to centerline "F" of cylindrical body 240. In the exemplary embodiment, hole 254 extends a predetermined depth into cylindrical body 240, but does not extend through to bore 242. In alternative embodiments, hole 254 may extend any depth into cylindrical body 240, including, for example, entirely through cylindrical body 240. Hole 254 is sized and shaped to receive anti-rotation pin 238 therein. In particular, hole 254 is sized to form an interference fit with anti-rotation pin 238. As used herein, the phrase "interference fit" means a value of tightness between anti-rotation pin 238 and hole 254, i.e., an amount of radial clearance between the components, as described above. Alternatively, anti-rotation pin 238 may be coupled to cylindrical body 240 using any suitable fastening technique that enables nut plate assembly 200 to function as described herein. In the exemplary embodiment, an upper portion of anti-rotation pin 238 extends through longitudinal slot 234 to facilitate preventing rotation of floating nut 206 while enabling axial movement during use of nut plate assembly 200.

In the exemplary embodiment, floating nut 206 includes shoulder portion 258 extending from second end 248 axially along cylindrical body 240 a predetermined distance 260 that facilitates preventing over-stressing and/or damaging bias member 208 when bias member 208 is compressed, while enabling bias member 208 to urge cylindrical body 240 toward plate member 202 when extended. Shoulder portion 258 has a diameter that is smaller than the diameter of outer surface 256 of cylindrical body 240. In particular, shoulder portion 258 has a diameter configured to enable bias member 208 to slide onto shoulder portion 258, as shown in FIG. 10. Shoulder portion 258 enables bias member 208 to apply an axial force to cylindrical body 240 to urge cylindrical body 240 toward plate member 202, as described herein.

Nut plate assembly 200 is assembled substantially similar to nut plate assembly 100 described above. For example, to assemble nut plate assembly 200, bias member 208 is placed into shell member 204. Floating nut 206 is placed into shell member 204 such that bias member 208 seats about shoulder portion 258 of floating nut 206. Hole 254 of floating nut 206 is aligned with longitudinal slot 234. Anti-rotation pin 238 is press fit into hole 254 such that an end of anti-rotation pin 238 extends through longitudinal slot 234. First opening 224 of shell member 204 is substantially aligned with aperture 214 of plate member 202. Shell member 204 is pressed against plate member 202, thereby compressing bias member 208 within shell member 204. Retention tabs 212 are then curled or bent over flange 232 of shell member 204 to axially retain shell member 204 to plate member 202.

Figure 14:
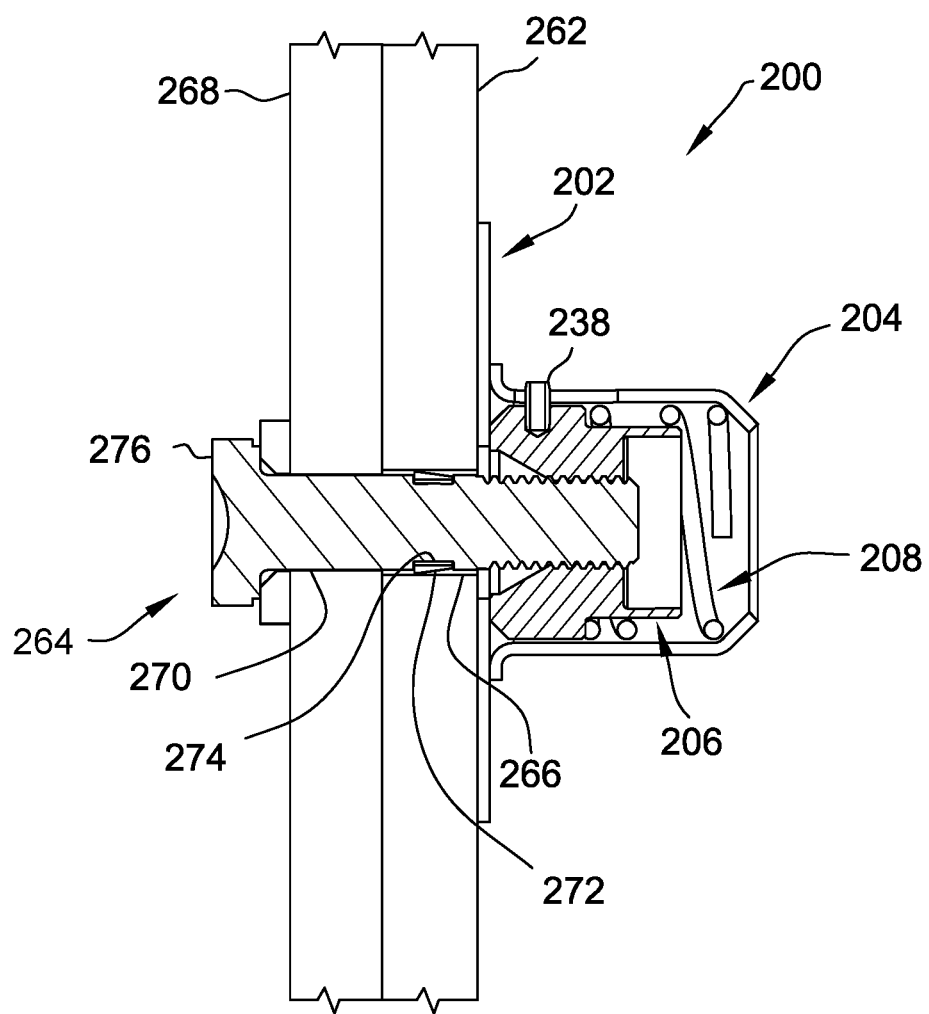
FIG. 14 is a cross-sectional view of the nut plate assembly shown in FIG. 9, coupled to a mounting structure and including a captive fastener.

FIG. 14 is a cross-sectional view of installed nut plate assembly 200 coupled to mounting structure 262, including a captive fastener 264. In the exemplary embodiment, nut plate assembly 200 is coupled to mounting structure 262 by, for example, and without limitation, adhesive bonding. Alternatively, nut plate assembly 200 is mechanically coupled to mounting structure 262, for example, and without limitation, by nut and bolt combinations, sheet metal fasteners, rivets, and the like. In the exemplary embodiment, mounting structure 262 includes an aperture 266 defined therethrough and sized to receive at least a portion of fastener 264. Fastener 264 extends through a panel 268 via aperture 270. In the exemplary embodiment, aperture 270 has a diameter smaller than the diameter of aperture 266. This facilitates capturing fastener 264 in panel 268 by locking mechanism 272. In particular, fastener 264 includes locking mechanism 272. In the exemplary embodiment, locking mechanism 272 is a lock ring. In alternative embodiments, locking mechanism 272 includes, for example, and without limitation, a retaining ring, an E-clip, a spring plunger, and/or any mechanism configured to facilitate capturing fastener 264 in panel 268. In the exemplary embodiment, locking mechanism 272 is coupled to a groove 274 formed in fastener 264 a predetermined distance from a head 276 of fastener 264. For example, groove 274 may be formed at a distance that enables panel 268 to be positioned between head 276 and locking mechanism 272, thereby facilitating capturing fastener 264 in panel 268. As fastener 264 is inserted through aperture 270, locking mechanism 272 collapses into groove 274. After locking mechanism 272 passes through aperture 270, it expands radially to its original diameter to prevent fastener 264 from being pulled back through panel 268. Panel 268, with fastener 264, is introduced to mounting structure 262 with nut plate assembly 200 for assembly. Fastener 264 is aligned with floating nut 206 and panel 268 is pushed toward mounting structure 262 until fastener 264 contacts female threaded portion 252 of floating nut 206. Fastener 264 is threadably engaged with floating nut 206 to secure panel 268 to mounting structure 262.

Figure 15:
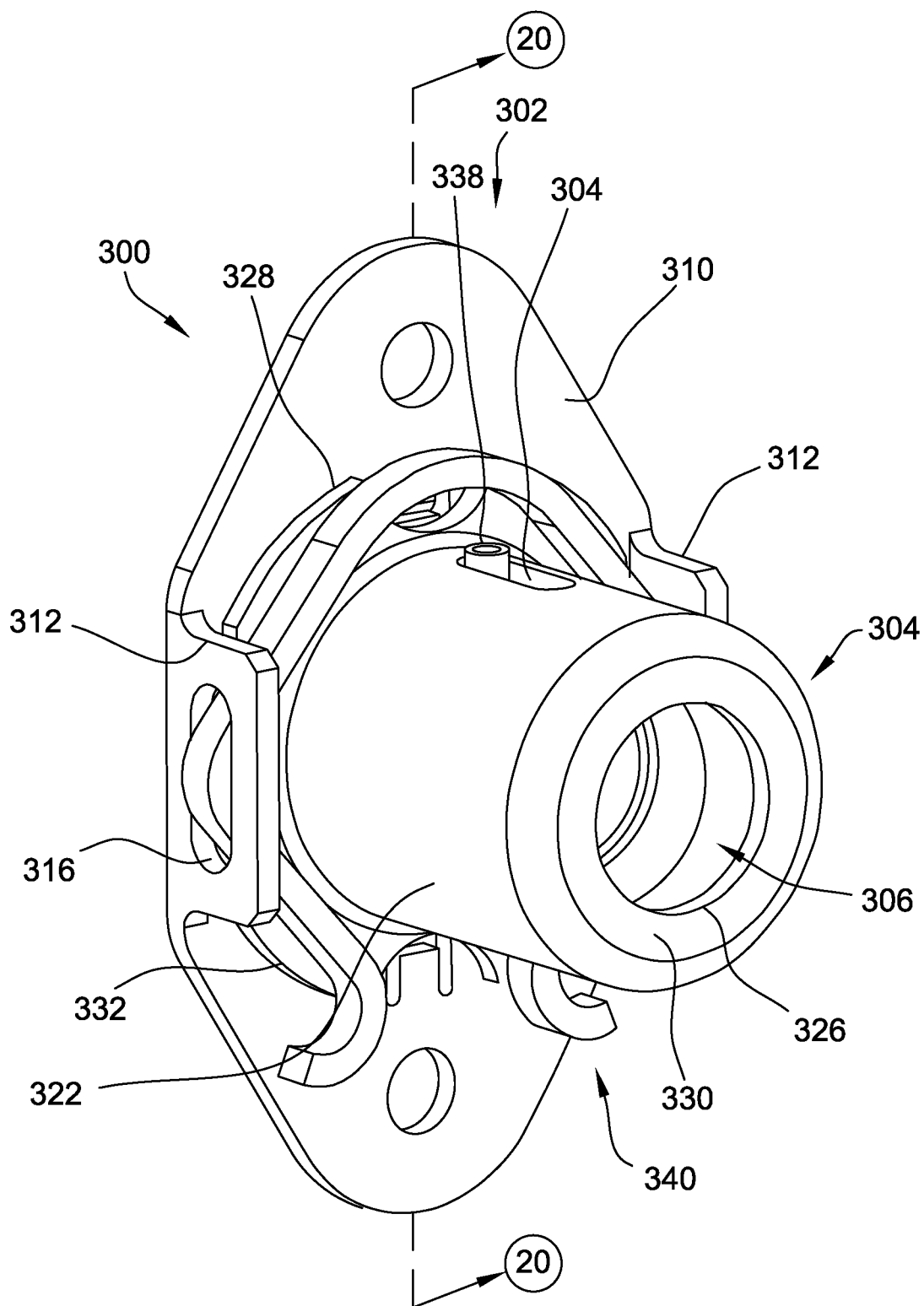
FIG. 15 is a perspective view of another spring-loaded nut plate assembly.
Figure 16:
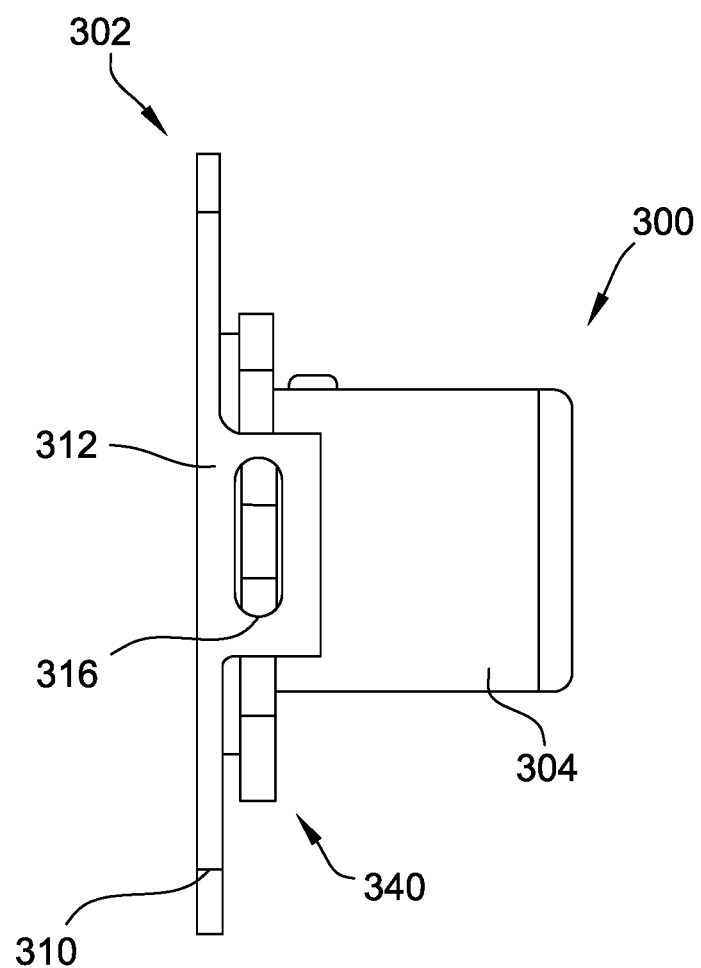
FIG. 16 is a side view of the nut plate assembly shown in FIG. 15.
Figure 17:
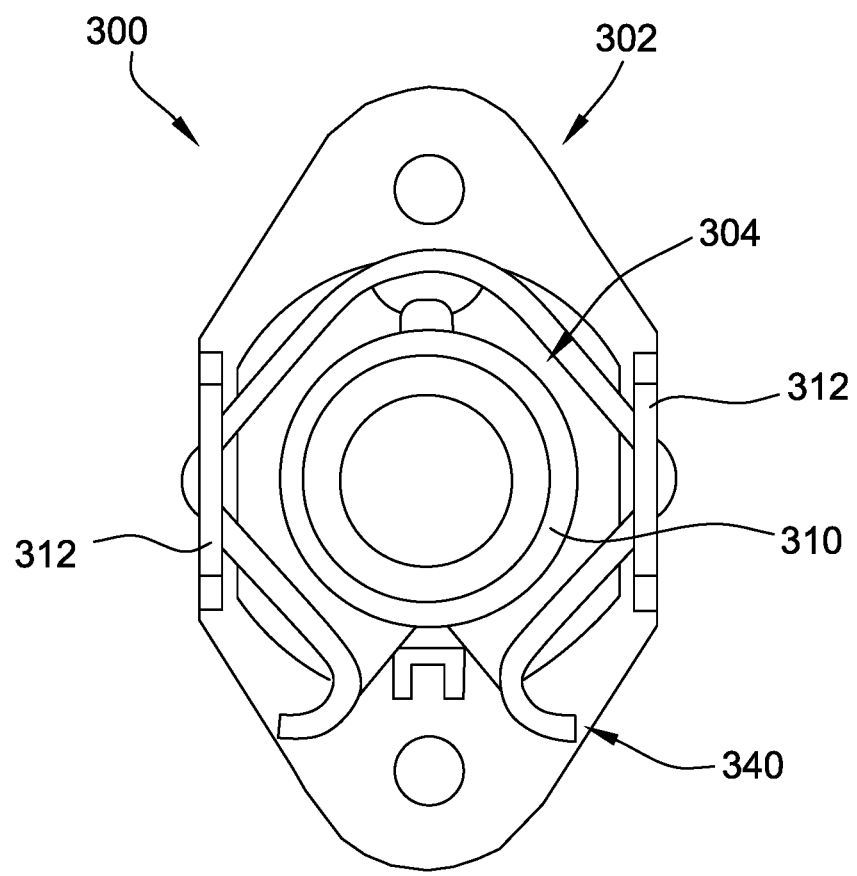
FIG. 17 is an end view of the nut plate assembly shown in FIG. 15.

FIG. 15 is a perspective view of a spring-loaded nut plate assembly 300. FIG. 16 is a side view of nut plate assembly 300. FIG. 17 is an end view of nut plate assembly 300. In the exemplary embodiment, nut plate assembly 300 is similar to nut plate assembly 100 (shown in FIG. 1) and nut plate assembly 200 (shown in FIG. 10) and includes a plate member 302, a shell member 304, a floating nut 306, and a bias member 308 (shown in FIG. 20). Plate member 302 includes a wall portion 310 and a plurality of retention tabs 312 integrally formed with wall portion 310. Wall portion 310 includes an aperture 314 defined therethrough for receiving a fastener (not shown in FIGS. 15-17). Retention tabs 312 extend from wall portion 310 and define openings 316. In alternative embodiments, nut plate assembly 300 includes any plate member 302 that enables nut plate assembly 300 to function as described herein.

In the exemplary embodiment, shell member 304 includes a substantially cylindrical wall 322 that defines a first opening 324 (shown in FIG. 20) at a first end 328 of shell member 304 and a second opening 326 at a second end 330 of shell member 304. Shell member 304 includes a flange 332 formed at first end 328. At second end 330, cylindrical wall 322 tapers radially inward, e.g., by a swaging process, to facilitate retaining floating nut 306 within shell member 304 when shell member 304 is coupled to plate member 302.

Also, in the exemplary embodiment, floating nut 306 is disposed within shell member 304 and is moveable relative to cylindrical wall 322. For example, floating nut 306 is moveable along a central axis of shell member 304 between a first position and a second position. In the first position, floating nut 306 is proximate first end 328. In the second position, floating nut 306 is proximate second end 330. In alternative embodiments, floating nut 306 is moveable in any manner that enables nut plate assembly 300 to operate as described herein.

Also, in the exemplary embodiment, shell member 304 includes a longitudinal slot 334 defined through cylindrical wall 322. Longitudinal slot 334 is sized and shaped to receive an anti-rotation pin 338 therethrough. In particular, anti-rotation pin 338 is coupled to floating nut 306 and extends through longitudinal slot 334 to prevent rotation of floating nut 306 while enabling axial movement during use of nut plate assembly 300. In the exemplary embodiment, anti-rotation pin 338 is a spring pin. Alternatively, anti-rotation pin 338 may be any type of anti-rotation mechanism that secures floating nut 306 as described herein, including for example, and without limitation, a dowel pin and/or a threaded fastener.

In addition, in the exemplary embodiment, nut plate assembly 300 includes a retention member 340 coupled to plate member 302 and shell member 304. In particular, in the exemplary embodiment, retention member 340 includes a clip 342 configured to extend at least partially around shell member 304 and extend over flange 332. Clip 342 is configured to engage retention tabs 312 when clip 342 is positioned around shell member 304. Accordingly, retention member 340 and retention tabs 312 couple shell member 304 to plate member 302 and axially retain shell member 304 with respect to plate member 302. First end 328 of shell member 304 contacts plate member 302 and flange 332 is positioned between clip 342 and wall portion 310 when retention member 340 is coupled to plate member 302 and shell member 304.

Figure 18:
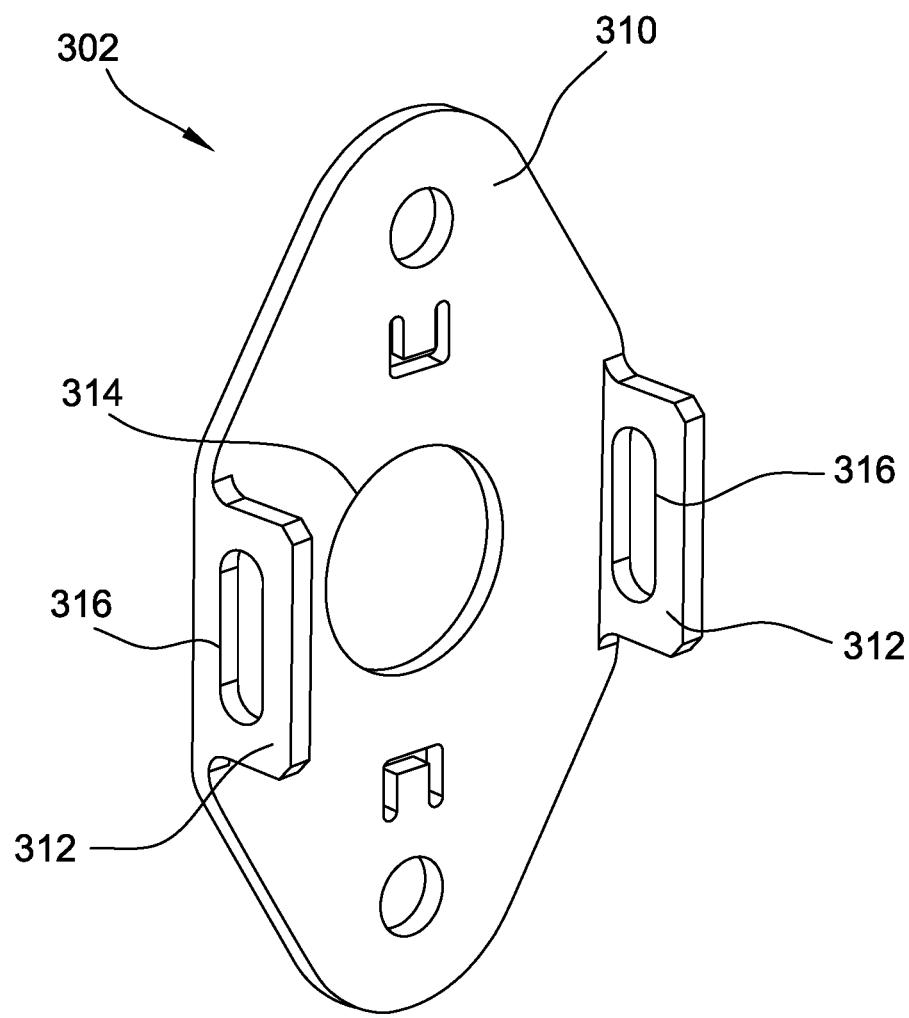
FIG. 18 is a perspective view of a plate member of the nut plate assembly shown in FIGS. 15-17.
Figure 19:
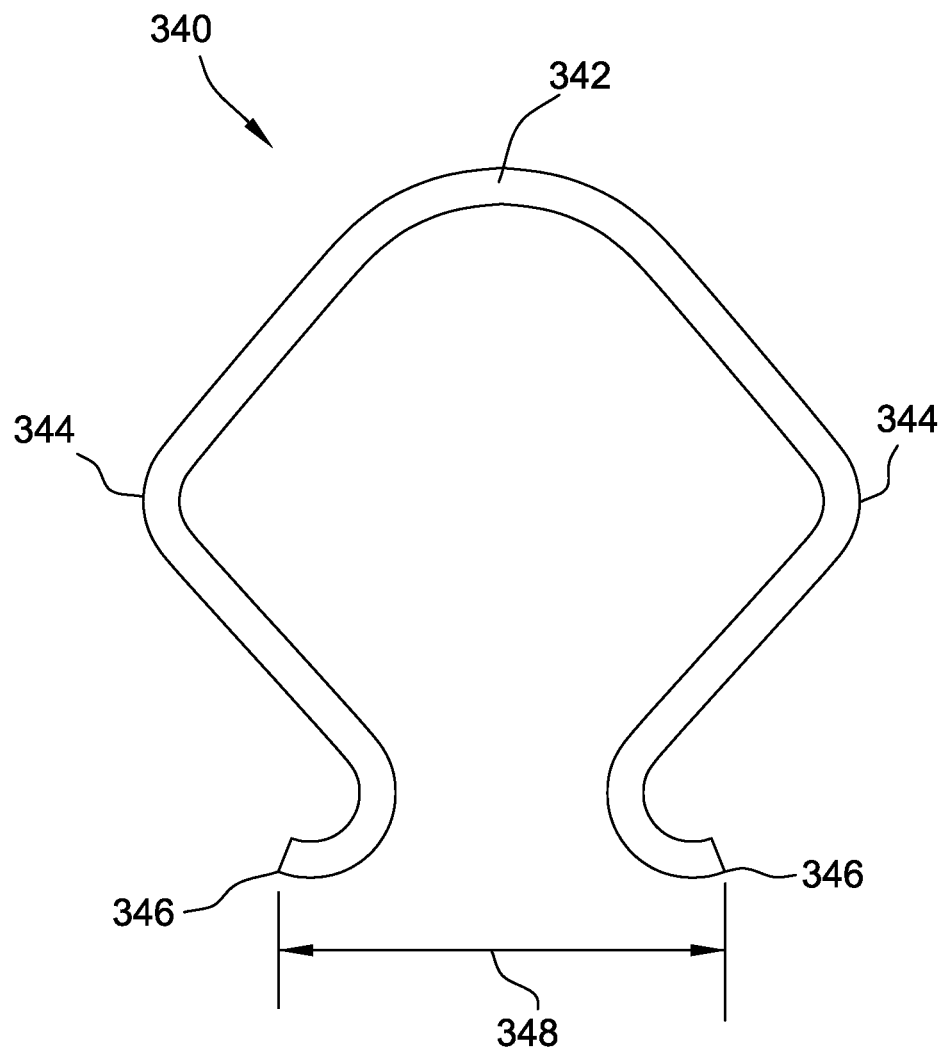
FIG. 19 is a top view of a retention member of the nut plate assembly shown in FIGS. 15-17.

FIG. 18 is a perspective view of plate member 302 of nut plate assembly 300 (shown in FIG. 15). FIG. 19 is a top view of retention member 340 of nut plate assembly 300 (shown in FIG. 15). Clip 342 of retention member 340 has a curved shape and is configured to extend around shell member 304 (shown in FIG. 15). In particular, clip 342 forms a loop. Ends 346 of clip 342 are adjacent each other and define a gap 348 therebetween. In addition, clip 342 includes elbows 344 which are configured to extend into openings 316 on opposite sides of plate member 302. In the exemplary embodiments, openings 316 are elongated slots that are configured to receive elbows 344. In alternative embodiments, retention member 340 engages plate member 302 in any manner that enables nut plate assembly (shown in FIG. 15) to operate as described herein. For example, in some embodiments, retention tabs 312 are omitted and retention member 340 engages wall portion 310. In further embodiments, retention member 340 includes openings 316 that receive retention tabs 312.

In addition, in the exemplary embodiment, clip 342 is positionable between a first position and a second position. In the first position, elbows 344 are spaced apart a first distance and clip 342 is configured to engage retention tabs 312. In the second position, elbows 344 are spaced apart a second distance that is less than the first distance and clip 342 is not engaged with retention tabs 312. Accordingly, the first position and the second position enable retention member 340 to be removably coupled to plate member 302 and shell member 304 (shown in FIG. 15). Moreover, retention member 340 enables removal of shell member 304 (shown in FIG. 15) and floating nut 306 (shown in FIG. 15) from plate member 302. For example, clip 342 is moved between the first position and the second position by pressing on ends 346 of clip 342 to decrease the width of gap 348. In the second position, elbows 344 do not extend through openings 316 in retention tabs 312 and allow removal of retention member 340 from nut plate assembly 300 (shown in FIG. 15). After retention member 340 is removed, shell member 304 (shown in FIG. 15) is free from plate member 302. In alternative embodiments, shell member 304 is coupled to plate member 302 in any manner that enables floating nut plate assembly 300 (shown in FIG. 15) to operate as described herein. For example, in some embodiments, retention member 340 includes, without limitation, a spring, a hinge, a fastener, a clamp, and adhesive. In further embodiments, retaining clips 342 are flexible and are configured to move between a first positon and a second position.

Figure 20:
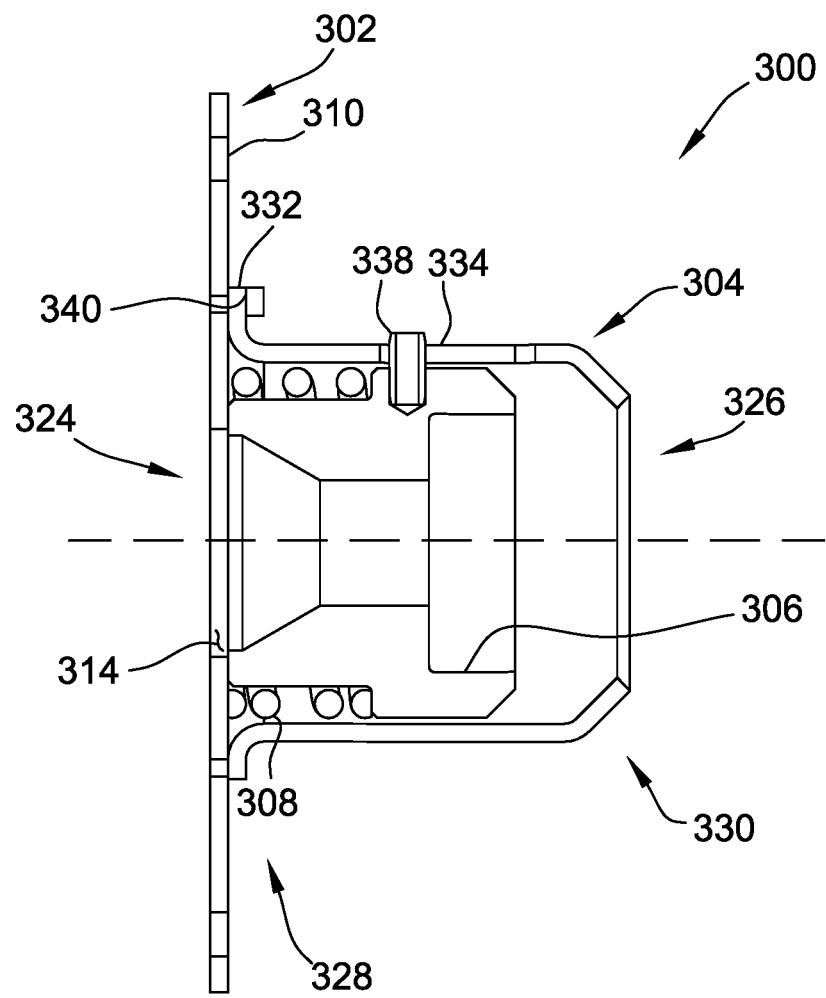
FIG. 20 is a cross-sectional view of the nut plate assembly shown in FIGS. 15-17, taken about line 20-20 shown in FIG. 15.

FIG. 20 is a cross-sectional view of the nut plate assembly 300, taken about line 20-20 (shown in FIG. 15). In the exemplary embodiment, bias member 308 is positioned within shell member 304 and between plate member 302 and floating nut 306. As such, bias member 308 facilitates biasing floating nut 306 axially away from plate member 302 and towards the second position. During use of nut plate assembly 300, bias member 308 facilitates pulling the attaching structure together as a fastener (not shown in FIGS. 15-20) is coupled with floating nut 306. Bias member 308 may function as a damping element and facilitates providing a pre-load force to a fastened joint. In the exemplary embodiment, bias member 308 is a compression spring. Alternatively, bias member 308 may be any type of bias or force provider that enables nut plate assembly 300 to function as described herein. The pre-load force on floating nut 306 may be adjusted by varying the wire diameter and spring length of bias member 308. In the exemplary embodiment, the wire diameter and spring length of bias member 308 is selected to provide the necessary pre-load required for operation of nut plate assembly 300, while maintaining bias member 308 in an axial resiliency range. In alternative embodiments, nut plate assembly 300 includes any bias member 308 that enables nut plate assembly 300 to function as described herein. For example, in some embodiments, bias member 308 is positioned within shell member 304 and between floating nut 306 and second end 330.

Figure 21:
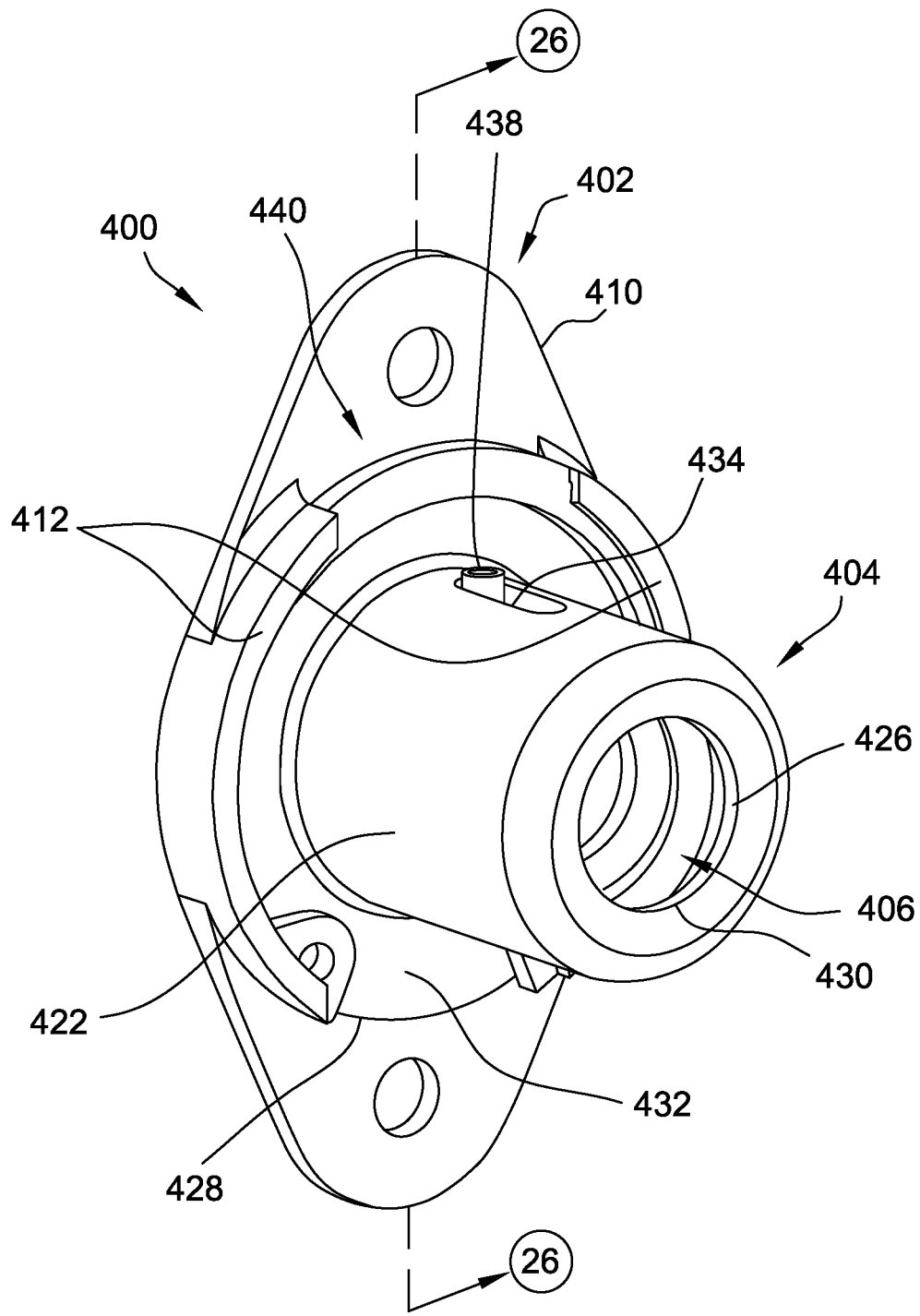
FIG. 21 is a perspective view of another spring-loaded nut plate assembly.
Figure 22:
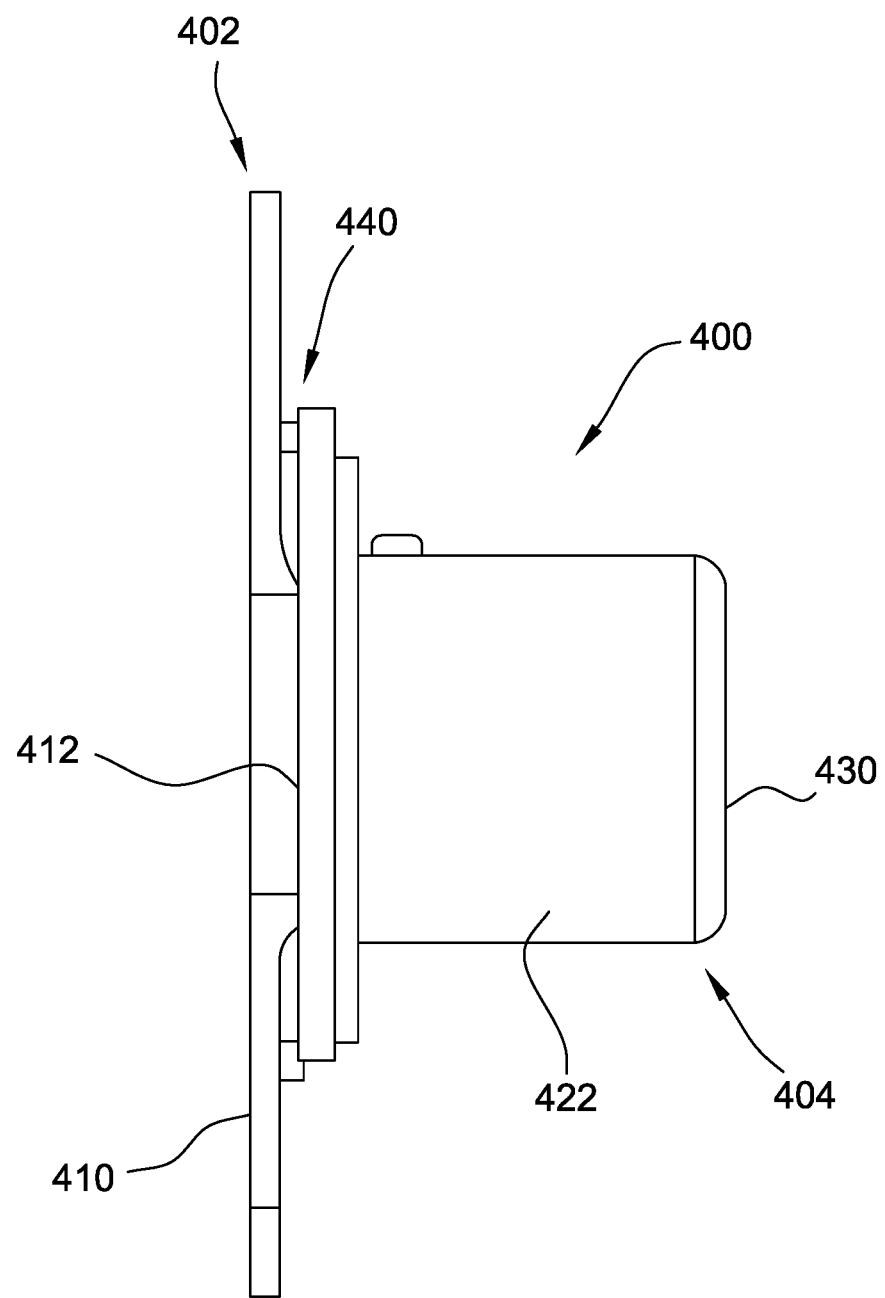
FIG. 22 is a side view of the nut plate assembly shown in FIG. 21.
Figure 23:
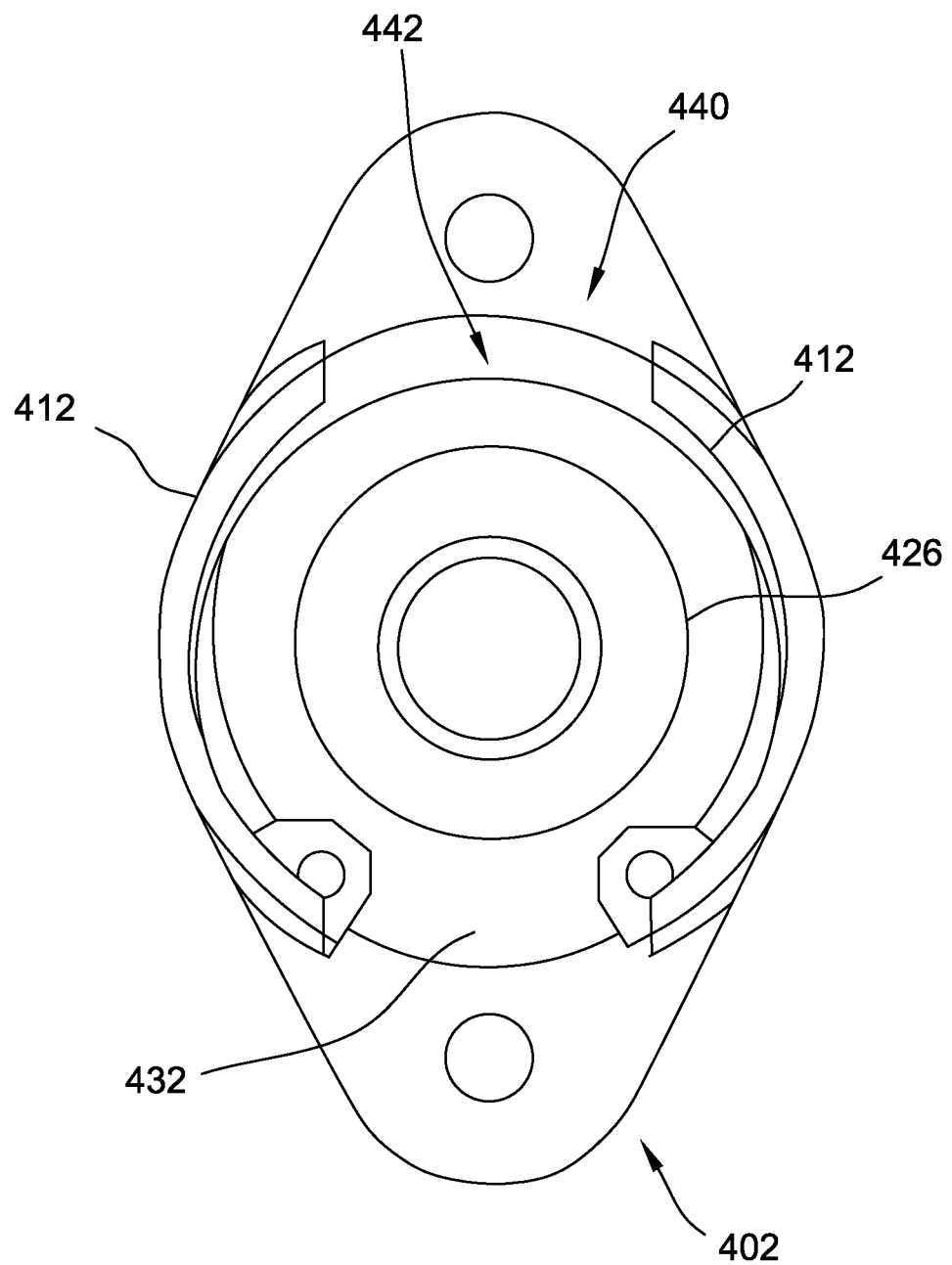
FIG. 23 is an end view of the nut plate assembly shown in FIG. 21.

FIG. 21 is a perspective view of a spring-loaded nut plate assembly 400. FIG. 22 is a side view of nut plate assembly 400. FIG. 23 is an end view of nut plate assembly 400. In the exemplary embodiment, nut plate assembly 400 is similar to nut plate assembly 300 (shown in FIG. 15) and includes a plate member 402, a shell member 404, a floating nut 406, and a bias member 408 (shown in FIG. 26). Plate member 402 includes a wall portion 410 and a plurality of retention tabs 412 integrally formed with wall portion 410. Wall portion 410 includes an aperture 414 defined therethrough for receiving a fastener (not shown in FIGS. 21-23). Retention tabs 412 extend from wall portion 410 and define channels 416. In alternative embodiments, nut plate assembly 400 includes any plate member 402 that enables nut plate assembly 400 to function as described herein.

In the exemplary embodiment, shell member 404 includes a substantially cylindrical wall 422 that defines a first opening 424 (shown in FIG. 26) at a first end 428 of shell member 404 and a second opening 426 at a second end 430 of shell member 404. Shell member 404 includes a flange 432 formed at first end 428. At second end 430, cylindrical wall 422 tapers radially inward, e.g., by a swaging process, to facilitate retaining floating nut 406 within shell member 404 when shell member 404 is coupled to plate member 402.

Also, in the exemplary embodiment, floating nut 406 is disposed within shell member 404 and is moveable relative to cylindrical wall 422. For example, floating nut 406 is moveable along a central axis of shell member 404 between a first position and a second position. In the first position, floating nut 406 is proximate first end 428. In the second position, floating nut 406 is proximate second end 430. In alternative embodiments, floating nut 406 is moveable in any manner that enables nut plate assembly 400 to operate as described herein.

Also, in the exemplary embodiment, shell member 404 includes a longitudinal slot 434 defined through cylindrical wall 422. Longitudinal slot 434 is sized and shaped to receive an anti-rotation pin 438 therethrough. In particular, anti-rotation pin 438 is coupled to floating nut 406 and extends through longitudinal slot 434 to prevent rotation of floating nut 406 while enabling axial movement during use of nut plate assembly 400. In the exemplary embodiment, anti-rotation pin 438 is a spring pin. Alternatively, anti-rotation pin 438 may be any type of anti-rotation mechanism that secures floating nut 406 as described herein, including for example, and without limitation, a dowel pin and/or a threaded fastener.

In addition, in the exemplary embodiment, nut plate assembly 400 includes a retention member 440 coupled to plate member 402 and shell member 404. In particular, in the exemplary embodiment, retention member 440 includes a clip 442 configured to extend at least partially around shell member 404 and extend over flange 432. Clip 442 is configured to engage retention tabs 412 when clip 442 is positioned around shell member 404. Accordingly, retention member 440 and retention tabs 412 couple shell member 404 to plate member 402 and axially retain shell member 404 with respect to plate member 402. First end 428 of shell member 404 contacts plate member 402 and flange 432 is positioned between clip 442 and wall portion 410 when retention member 440 is coupled to plate member 402 and shell member 404.

Figure 24:
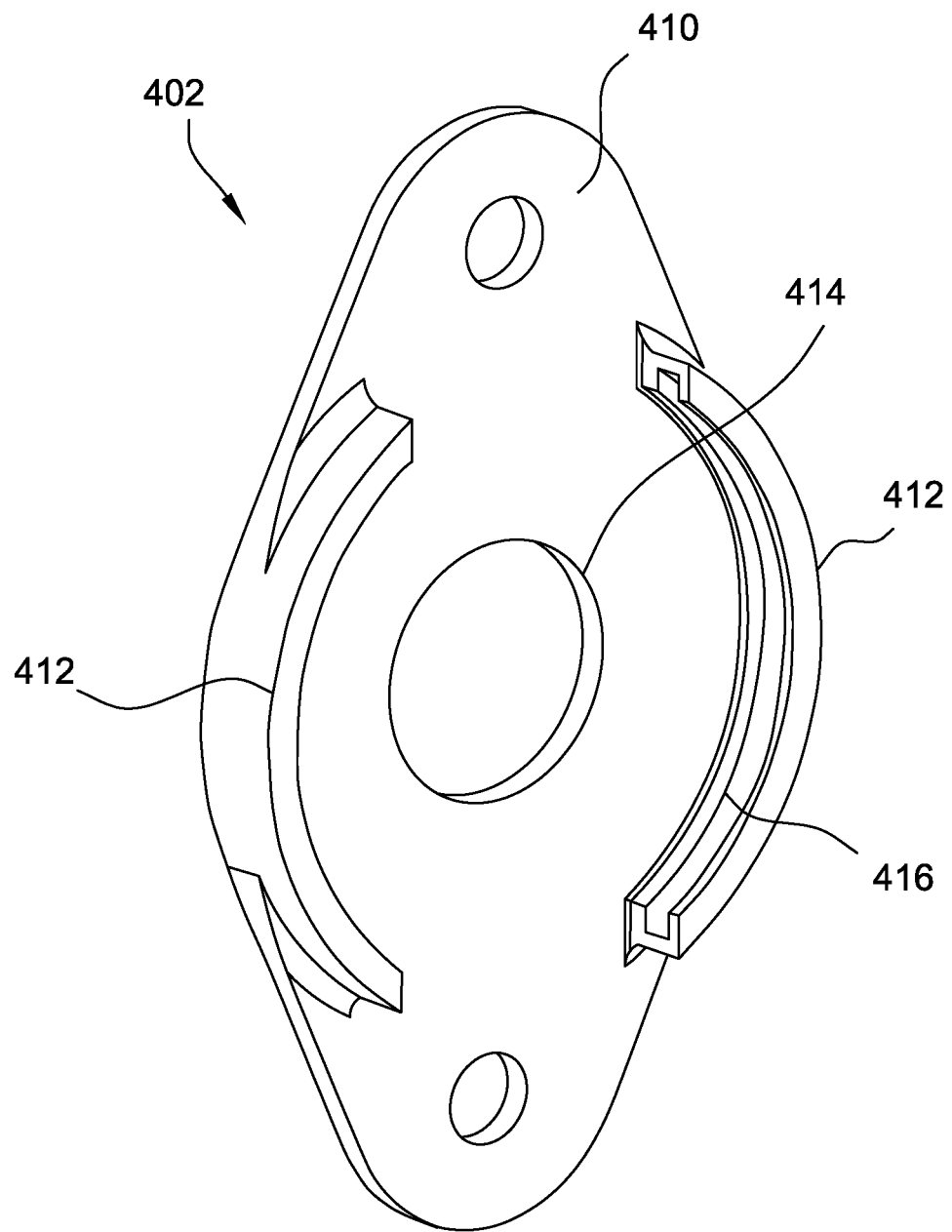
FIG. 24 is a perspective view of a plate member of the nut plate assembly shown in FIGS. 21-23.
Figure 25:
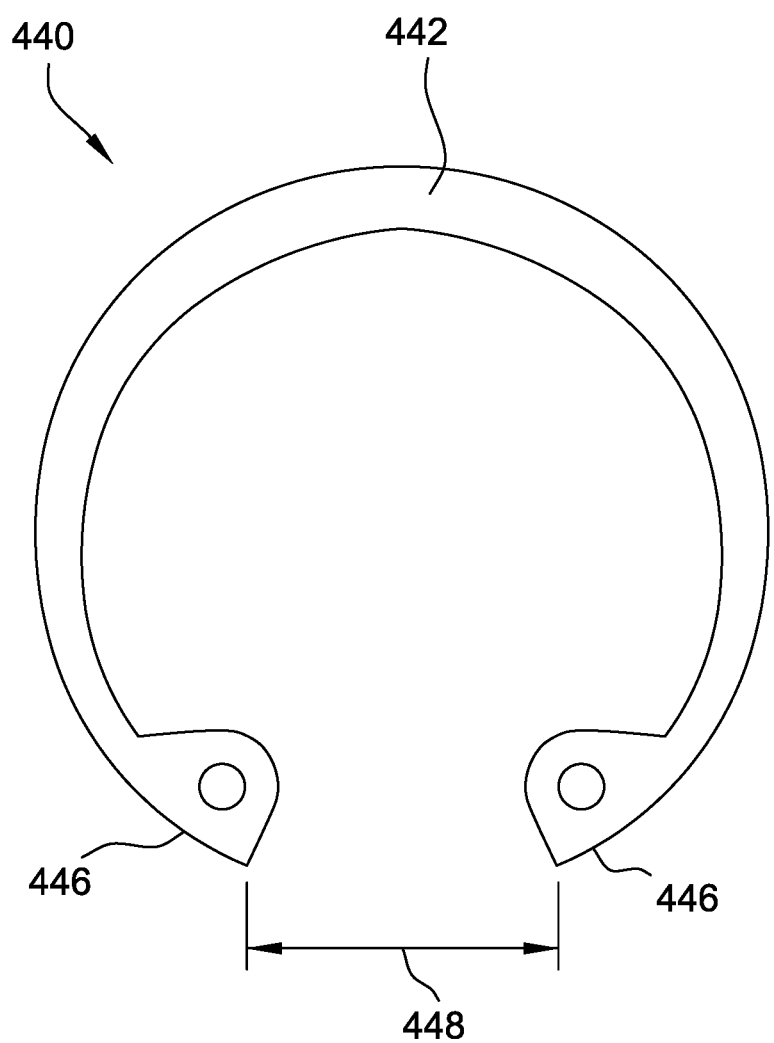
FIG. 25 is a top view of a retention member of the nut plate assembly shown in FIGS. 21-23.

FIG. 24 is a perspective view of plate member 402 of nut plate assembly 400 (shown in FIG. 21). FIG. 25 is a top view of retention member 440 of nut plate assembly 400 (shown in FIG. 21). Clip 442 of retention member 440 has a curved shape and is configured to extend around shell member 404 (shown in FIG. 21). In particular, clip 442 is a semicircle and includes ends 446 spaced circumferentially apart to define a gap 448 therebetween. In addition, clip 442 is sized and shaped to extend through channels 416 defined by retention tabs 412. In the exemplary embodiments, retention tabs 412 extend along at least a portion of the edge of wall portion 410 and are configured to extend over clip 442 when clip 442 extends through channels 416. In alternative embodiments, retention member 440 engages plate member 402 in any manner that enables nut plate assembly (shown in FIG. 21) to operate as described herein. For example, in some embodiments, retention member 440 includes a channel 416 that receives plate member 402.

In addition, in the exemplary embodiment, clip 442 is positionable between a first position and a second position. In the first position, clip 442 has a first diameter and is configured to engage retention tabs 412. In the second position, clip 442 has a second diameter that is less than the first diameter and clip 442 is not engaged with retention tabs 412. Accordingly, the first position and the second position enable retention member 440 to be removably coupled to plate member 402 and shell member 404 (shown in FIG. 21). Moreover, retention member 440 enables removal of shell member 404 (shown in FIG. 21) and floating nut 406 (shown in FIG. 21) from plate member 402. For example, clip 442 is moved between the first position and the second position by pressing on ends 446 of clip 442 to decrease the width of gap 448 and the diameter of clip 442. In the second position, clip 442 does not extend through channels 416 in retention tabs 412 and allows removal of retention member 440 from nut plate assembly 400 (shown in FIG. 21). After retention member 440 is removed, shell member 404 (shown in FIG. 21) is free from plate member 402.

Figure 26:
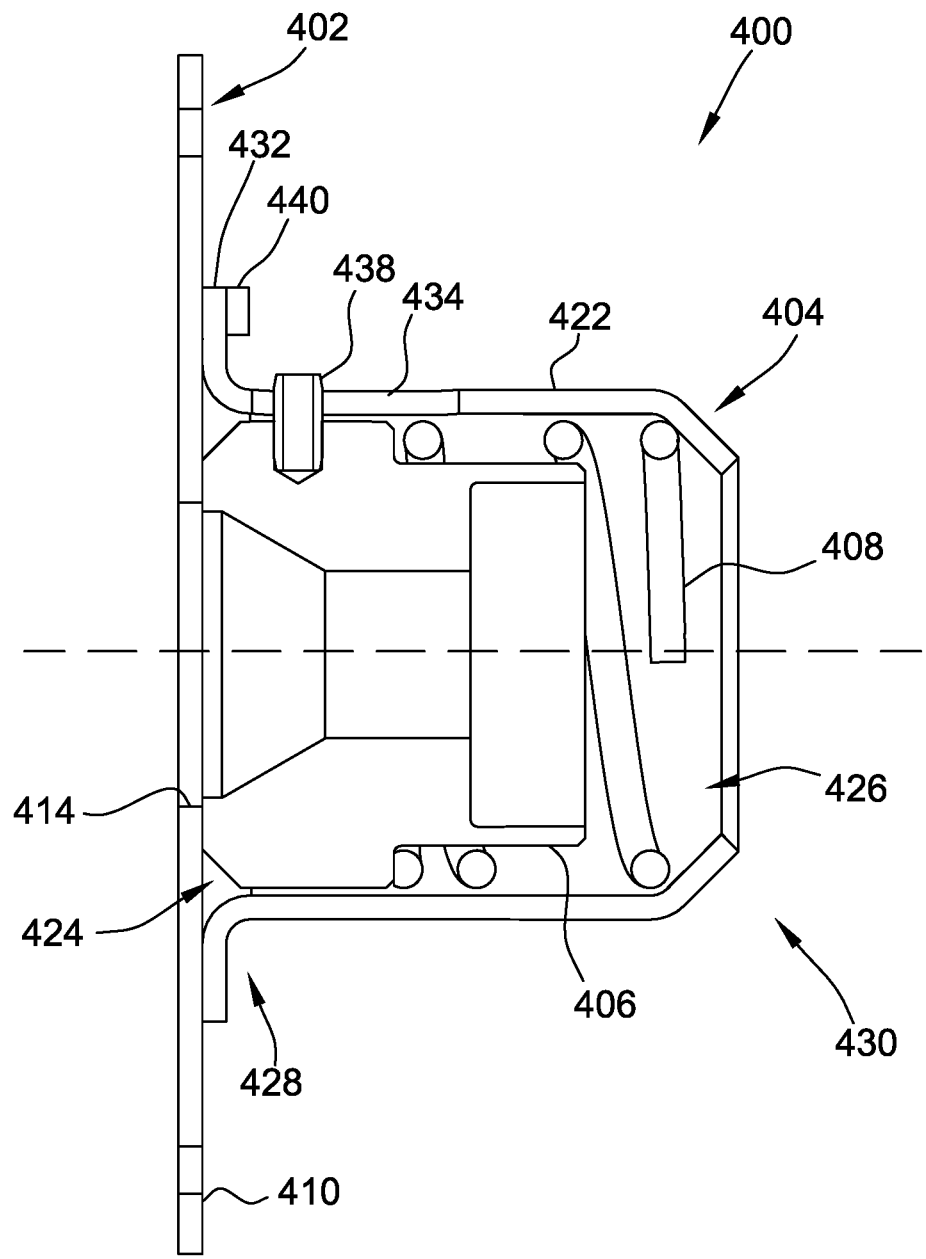
FIG. 26 is a cross-sectional view of the nut plate assembly shown in FIGS. 21-23, taken about line 26-26 shown in FIG. 21.

FIG. 26 is a cross-sectional view of nut plate assembly 400, taken about line 26-26 (shown in FIG. 21). In the exemplary embodiment, bias member 408 is positioned within shell member 404 and between floating nut 406 and second end 430 of shell member 404. As such, bias member 408 facilitates biasing floating nut 406 axially toward plate member 402 and towards the first position. During use of nut plate assembly 400, bias member 408 facilitates pushing the attaching structure apart as a fastener (not shown in FIGS. 21-26) is coupled with floating nut 406. Bias member 408 may function as a damping element. In the exemplary embodiment, bias member 408 is a compression spring. Alternatively, bias member 408 may be any type of bias or force provider that enables nut plate assembly 400 to function as described herein. The force on floating nut 406 may be adjusted by varying the wire diameter and spring length of bias member 408. In the exemplary embodiment, the wire diameter and spring length of bias member 408 is selected to provide a desired bias force for operation of nut plate assembly 400, while maintaining bias member 408 in an axial resiliency range. In alternative embodiments, nut plate assembly 400 includes any bias member 408 that enables nut plate assembly 400 to function as described herein. For example, in some embodiments, bias member 408 is positioned within shell member 404 and between plate member 402 and floating nut 406.

Figure 27:
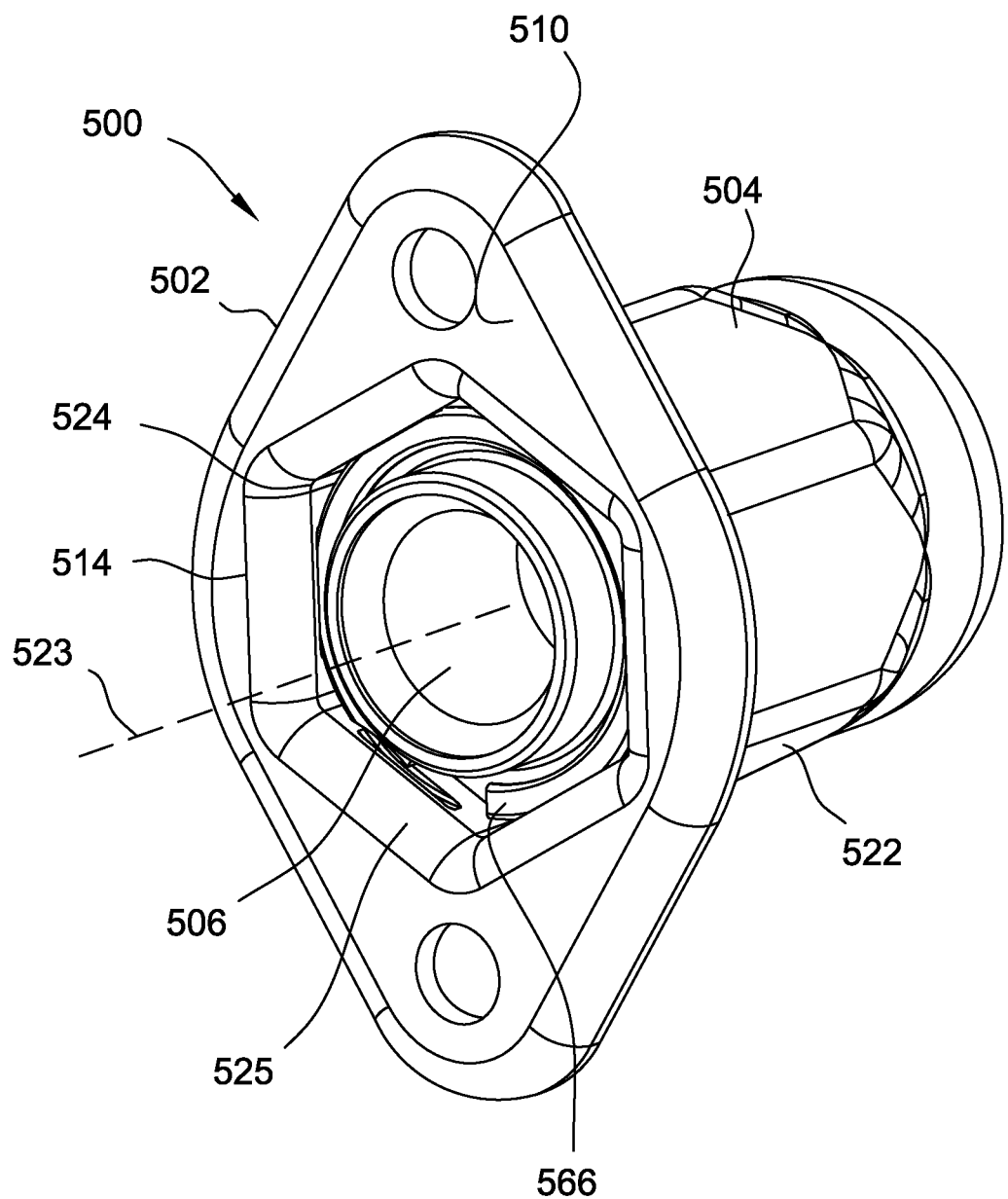
FIG. 27 is a perspective view of another spring-loaded nut plate assembly.
Figure 28:
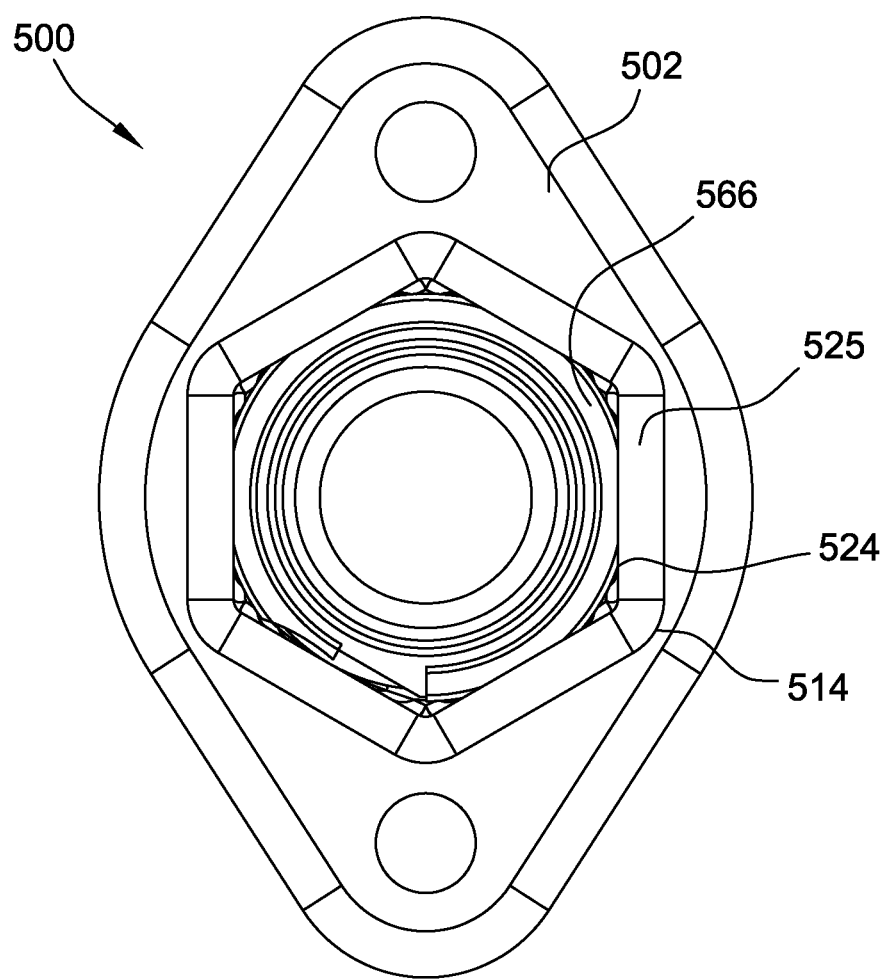
FIG. 28 is a first end view of the nut plate assembly shown in FIG. 27.
Figure 29:
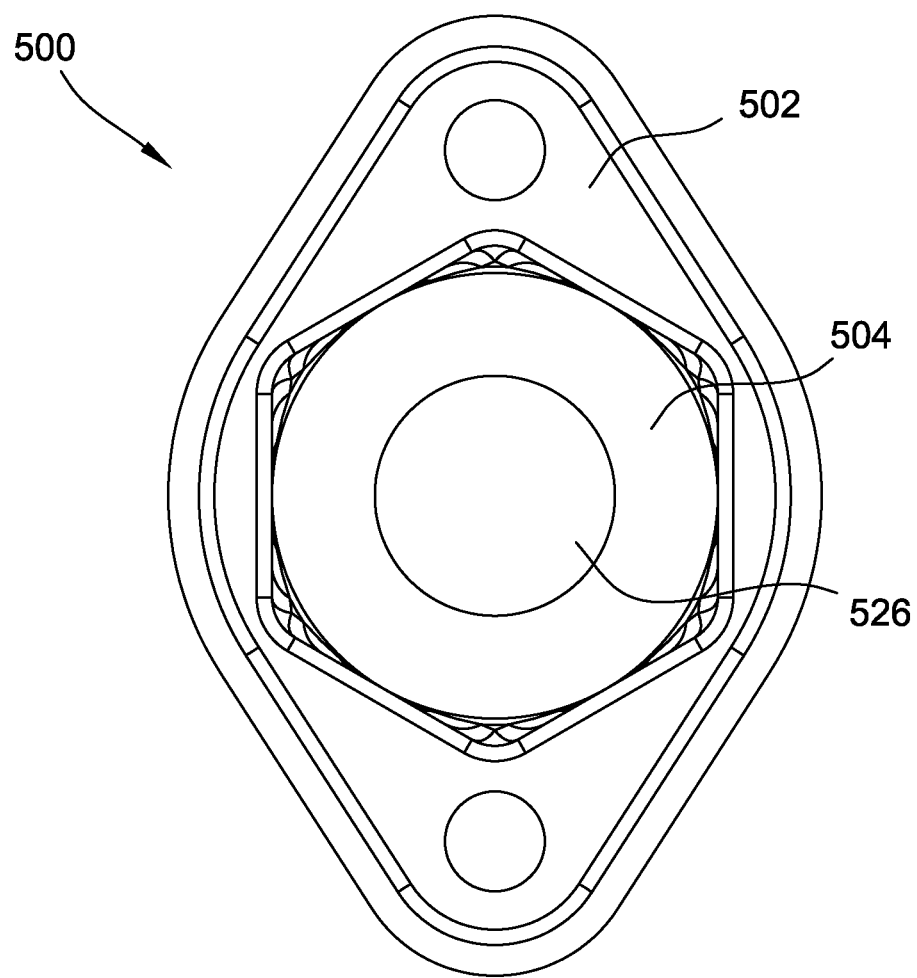
FIG. 29 is a second end view of the nut plate assembly shown in FIG. 27.
Figure 30:
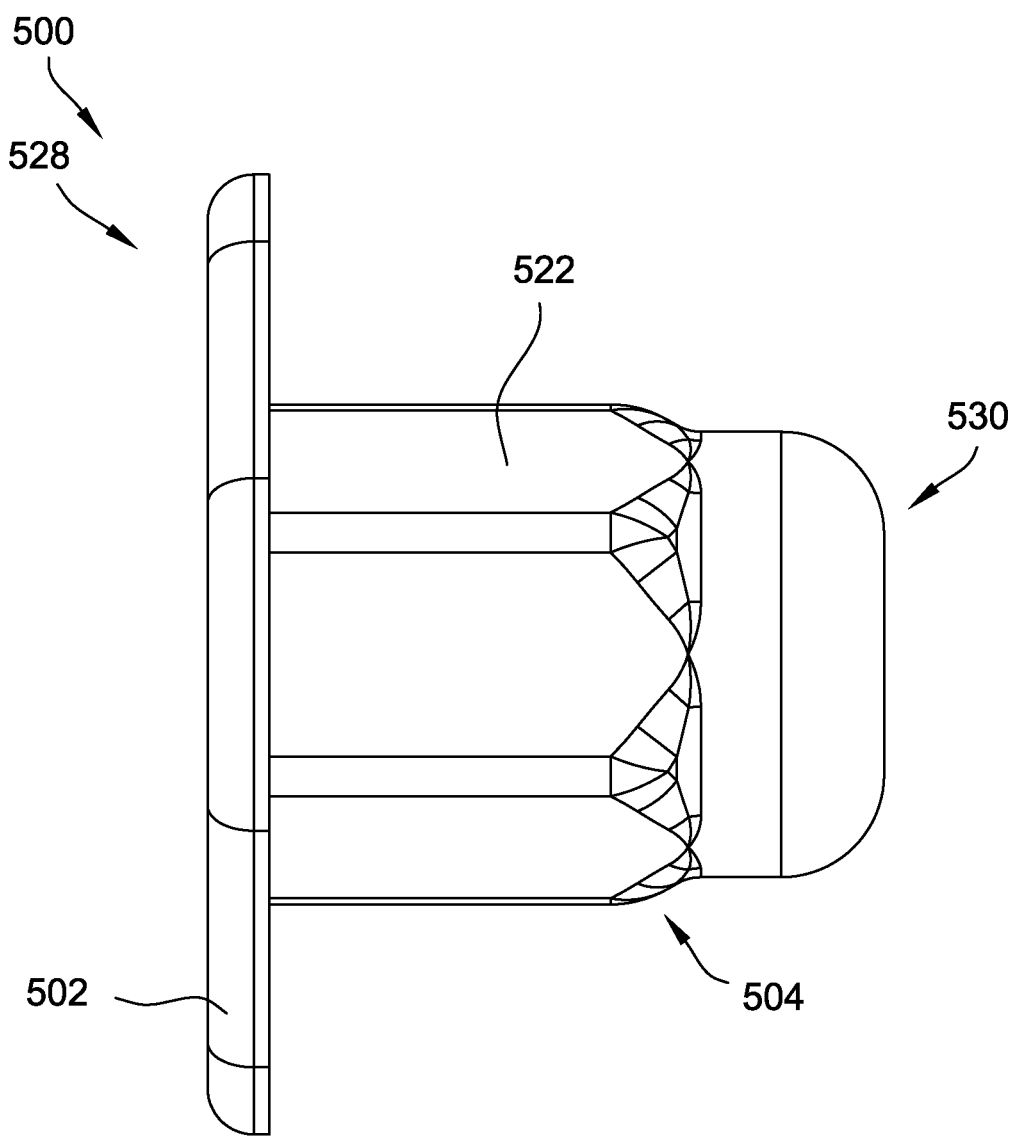
FIG. 30 is an end view of nut plate assembly shown in FIG. 27.
Figure 31:
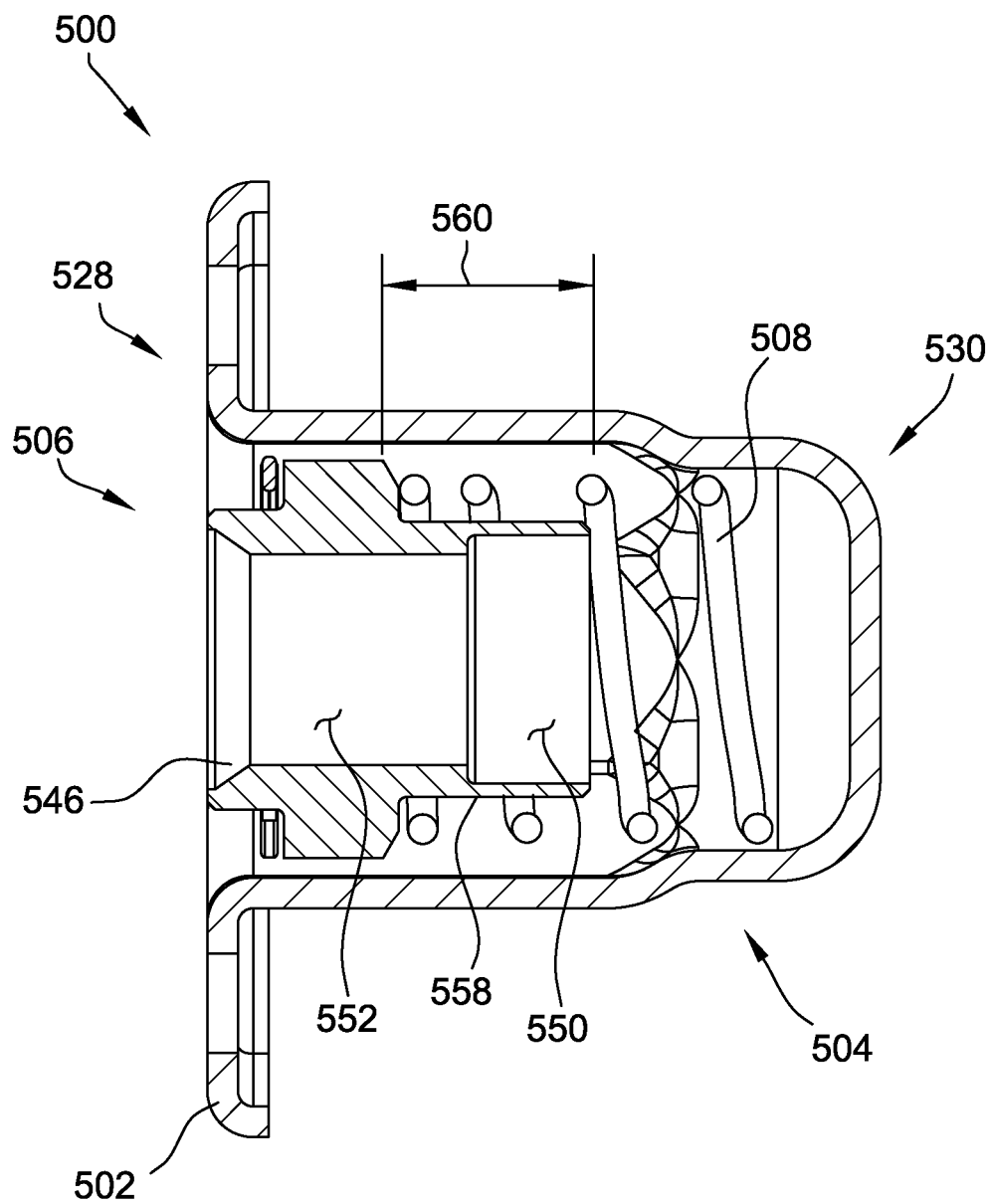
FIG. 31 is a cross-sectional view of the nut plate assembly, taken about line 31-31 shown in FIG. 28.

FIG. 27 is a perspective view of a spring-loaded nut plate assembly 500. FIG. 28 is a front end view of nut plate assembly 500. FIG. 29 is a second end view of nut plate assembly 500. FIG. 30 is an end view of nut plate assembly 500. FIG. 31 is a cross-sectional view of nut plate assembly 500, taken about line 31-31 shown in FIG. 28. In the exemplary embodiment, nut plate assembly 500 is similar to nut plate assembly 100 (shown in FIG. 1) and includes a plate member 502, a shell member 504, a floating nut 506, and a bias member 508 (shown in FIG. 31). In the exemplary embodiment, plate member 502 and shell member 504 are integrally formed as a single piece. Plate member 502 includes a wall portion 510. Wall portion 510 includes an aperture 514 defined therethrough for receiving a fastener (not shown in FIGS. 27-31). In addition, aperture 514 is sized and shaped to allow floating nut 506 to be positioned therethrough. In the exemplary embodiment, aperture 514 is a hexagon. In alternative embodiments, nut plate assembly 500 includes any plate member 502 that enables nut plate assembly 500 to operate as described herein.

In the exemplary embodiment, shell member 504 includes a wall 522 that extends around and along a central axis 523 of nut plate assembly 500. Wall 522 defines a first opening 524 at a first end 528 of shell member 504 and a second opening 526 at a second end 530 of shell member 504. First opening 524 and second opening 526 are generally concentric with each other. At first end 528, shell member 504 is joined to wall portion 510 of plate member 502. A curved or angled edge 525 extends between aperture 514 and first opening 524 to facilitate positioning clip 566 through aperture 514. At second end 530, wall 522 tapers radially inward to facilitate retaining floating nut 506 within shell member 504. Wall 522 extends continuously from first end 528 to second end 530 and is free of openings other than first opening 524 and second opening 526. Accordingly, shell member 504 and plate member 502 inhibit the entrapment of debris and containments during use of nut plate assembly 500. In alternative embodiments, nut plate assembly 500 includes any shell member 504 that enables nut plate assembly 500 to operate as described herein.

Also, in the exemplary embodiment, floating nut 506 is disposed within shell member 504 and is moveable along central axis 523. For example, floating nut 506 is moveable along central axis 523 of shell member 504 between a first position and a second position. In the first position, floating nut 506 is proximate first end 528. In the second position, floating nut 506 is proximate second end 530. In addition, in some embodiments, floating nut 506 has radial float about central axis 523 within wall 522. In alternative embodiments, floating nut 506 is moveable in any manner that enables nut plate assembly 500 to operate as described herein.

In addition, in the exemplary embodiment, a cross-sectional shape of shell member 504 is defined by wall 522. The cross-sectional shape of shell member 504 is taken along a plane perpendicular to central axis 523 and is configured to correspond to the cross-sectional shape of floating nut 506. Specifically, in the exemplary embodiment, shell member 504 and floating nut 506 have the same cross-sectional shape. In addition, shell member 504 and floating nut 506 define a gap therebetween that is sized to allow axial movement of floating nut 506 and prevent rotation of floating nut 506. For example, the gap between floating nut 506 and shell member 504 is less than the width of a planar side of floating nut 506. Accordingly, wall 522 of shell member 504 engages floating nut 506 to inhibit rotation of floating nut 506 when floating nut 506 is positioned within shell member 504. In the exemplary embodiment, shell member 504 and floating nut 506 are hexagons. In alternative embodiments, shell member 504 and floating nut 506 are any shapes that enable nut plate assembly 500 to operate as described herein. For example, in some embodiments, shell member 504 and/or floating nut 506 is, without limitation, a triangle, a rectangle, a trapezoid, a pentagon, a hexagon, a heptagon, an octagon, a nonagon, a decagon, a dodecagon, and a star. In further embodiments, at least one side of shell member 504 and/or floating nut 506 is curved.

In the exemplary embodiment, bias member 508 is positioned within shell member 504 between floating nut 506 and second end 530 of shell member 504. As such, bias member 508 facilitates biasing floating nut 506 axially toward plate member 502 and towards the first position. During use of nut plate assembly 500, bias member 508 facilitates pushing the attaching structure apart as a fastener (not shown in FIGS. 27 and 28) is coupled with floating nut 506. Bias member 508 may function as a damping element. In the exemplary embodiment, bias member 508 is a compression spring. Alternatively, bias member 508 may be any type of bias or force provider that enables nut plate assembly 500 to function as described herein.

Figure 32:
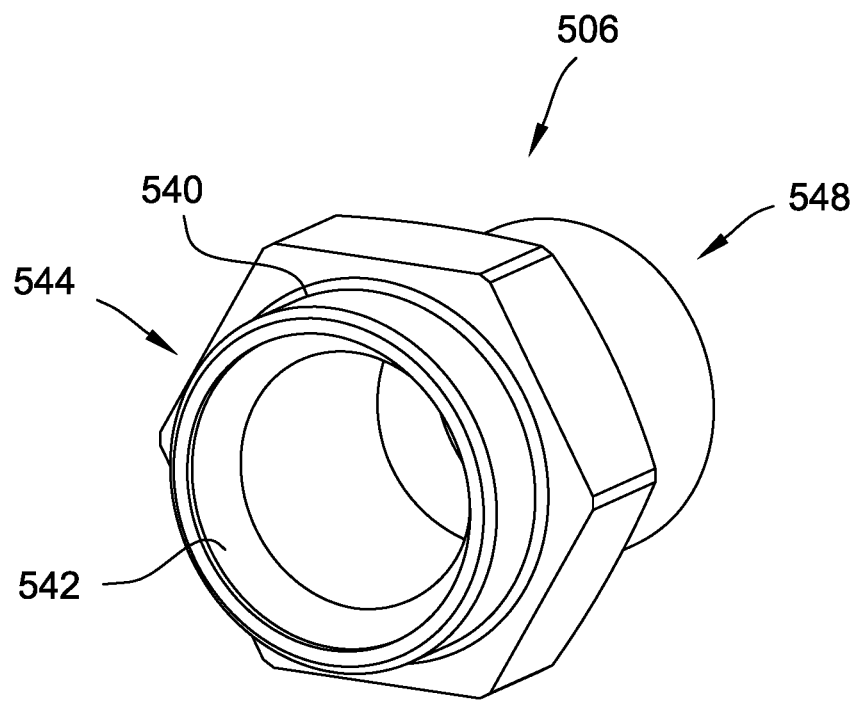
FIG. 32 is a perspective view of a floating nut for use with the nut plate assembly shown in FIGS. 27-31.
Figure 33:
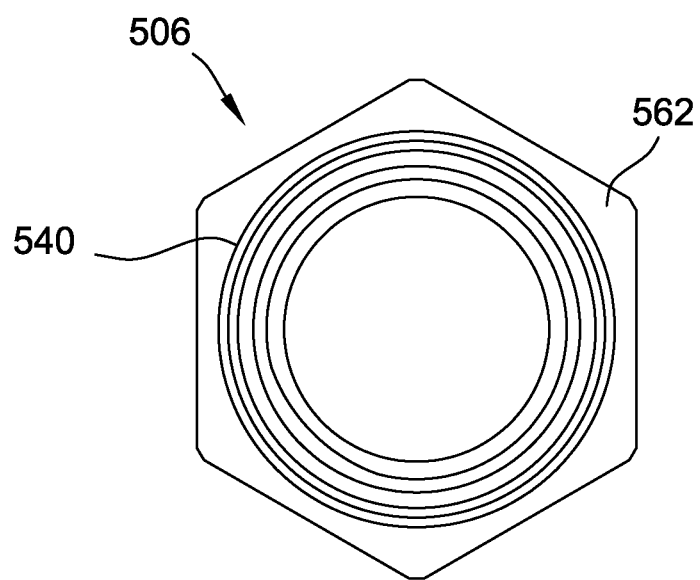
FIG. 33 is an end view of the floating nut shown in FIG. 32.
Figure 34:
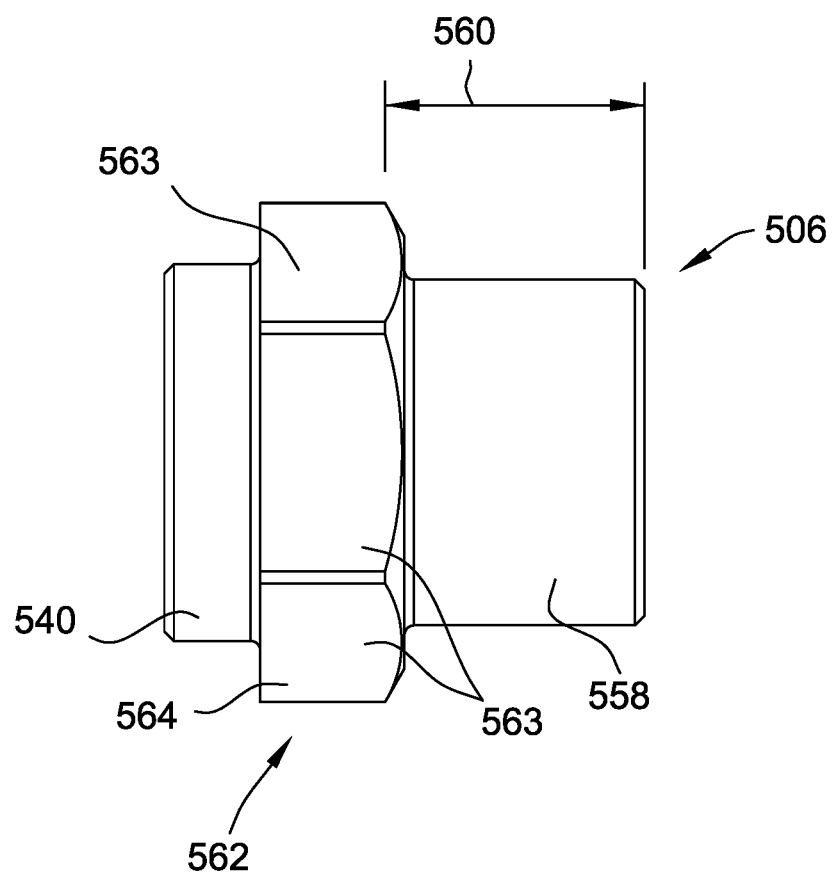
FIG. 34 is a side view of the floating nut shown in FIG. 32.

FIG. 32 is a perspective view of floating nut 506 for use with nut plate assembly 500 (shown in FIG. 27). FIG. 33 is an end view of floating nut 506. FIG. 34 is a side view of floating nut 506. In the exemplary embodiment, floating nut 506 has a body 540 that defines a bore 542 therethrough. At a first end 544 of body 540, bore 542 includes a tapered portion 546 configured to facilitate aligning a fastener (not shown in FIGS. 32-33) with body 540. At a second end 548 of body 540, bore 542 includes a counter bored portion 550. Bore 542 includes a female threaded portion 552 extending between tapered portion 546 and counter bored portion 550 for threadably coupling to a fastener during use of nut plate assembly 500.

In the exemplary embodiment, floating nut 506 includes shoulder portion 558 extending from second end 548 axially along body 540 to a flange 562. Shoulder portion 558 extends a predetermined distance 560 that facilitates preventing over-stressing and/or damaging bias member 508 when bias member 508 is compressed, while enabling bias member 508 to urge body 540 toward plate member 502 when extended. Shoulder portion 558 has a diameter that is configured to enable bias member 508 to slide onto shoulder portion 558. Shoulder portion 558 enables bias member 508 to apply an axial force to body 540 to urge body 540 toward plate member 502.

Also, in the exemplary embodiment, floating nut 506 includes flange 562 extending about body 540 proximate first end 544. Flange 562 engages shell member 504 to inhibit rotation of floating nut 506 about central axis 523 when floating nut 506 is positioned within shell member 504. Specifically, an outer surface 564 of flange 562 contacts an inner surface of shell member 504. Outer surface 564 is defined by a plurality of sides 563 that form the cross-sectional shape of flange 562. Specifically, sides 563 are planar and extend about a circumference of flange 562. Sides 563 are configured to engage wall 522. As described further above, the cross-sectional shape of floating nut 506 corresponds to the cross-sectional shape of shell member 504 (shown in FIGS. 27-30). In the exemplary embodiment, outer surface 564 of flange 562 is defined by six planar sides 563 forming a hexagonal cross-sectional shape. In alternative embodiments, floating nut 506 includes any flange 562 that enables floating nut 506 to operate as described herein.

Figure 35:
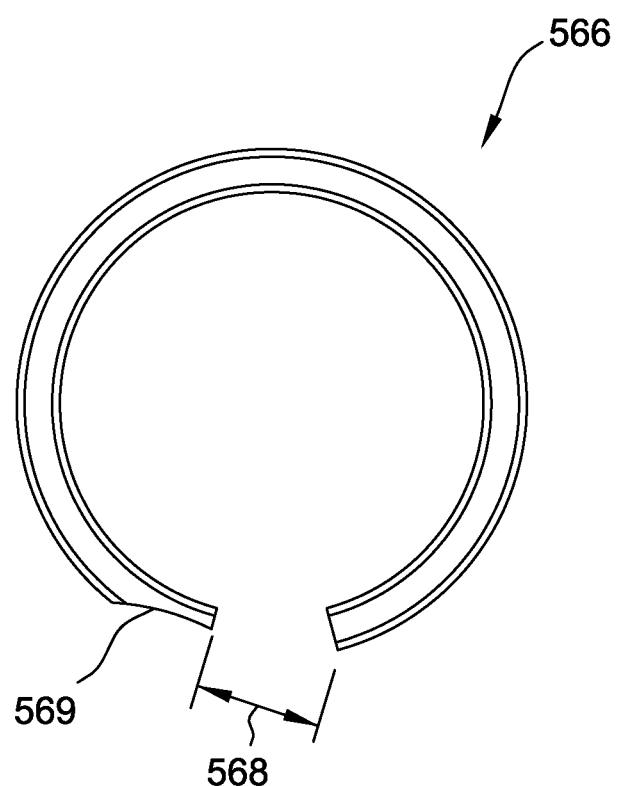
FIG. 35 is an end view of a clip for use with the nut plate assembly shown in FIGS. 27-31.
Figure 36:
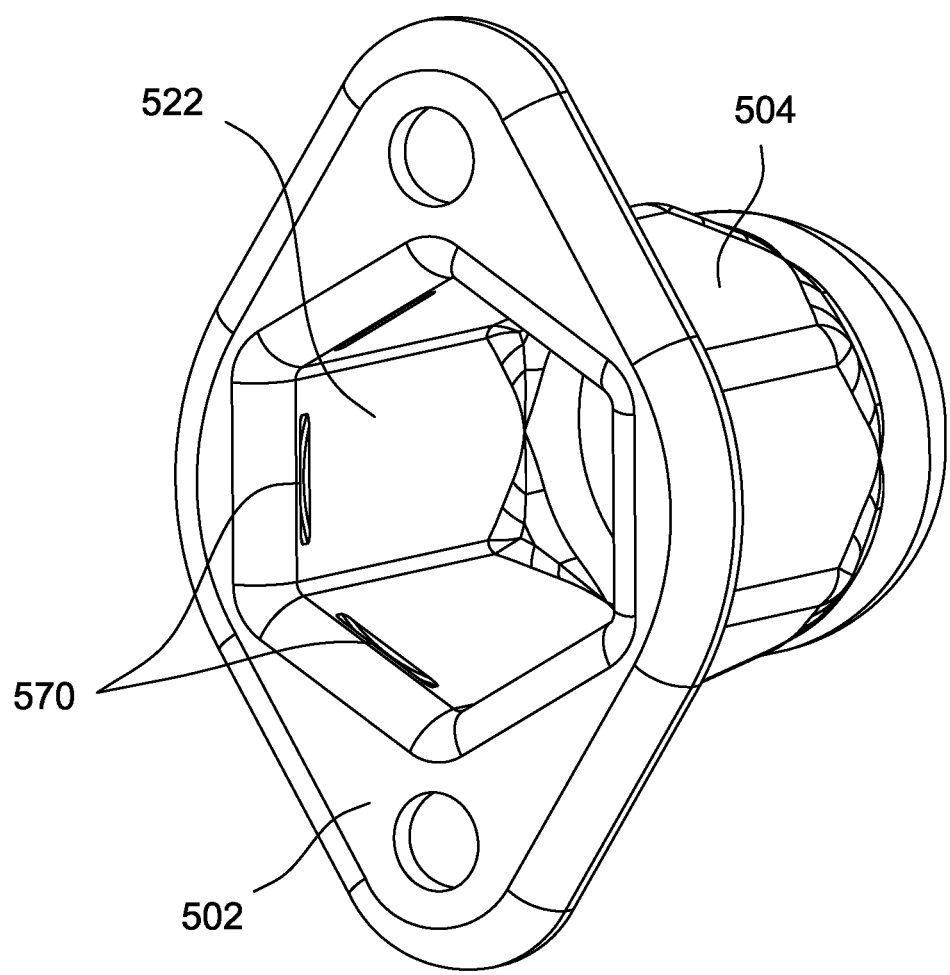
FIG. 36 is a perspective view of a plate member and a shell member for use with the nut plate assembly shown in FIGS. 27-31.

FIG. 35 is an end view of a clip 566. FIG. 36 is a perspective view of plate member 502 and shell member 504. In the exemplary embodiment, nut plate assembly 500 includes clip, more broadly a retention member, 566. Clip 566 is configured to engage shell member 504 and floating nut 506 (shown in FIGS. 32-34) to retain floating nut 506 within shell member 504. In the exemplary embodiment, clip 566 is circular and is arranged to extend around central axis 523 and body 540 when clip 566 is positioned in shell member 504. In addition, clip 566 defines a gap 568. In alternative embodiments, nut plate assembly 500 includes any retention member that enables nut plate assembly 500 to operate as described herein. For example, in some embodiments, clip 566 is attached to shell member 504, plate member 502, and/or floating nut 506.

Also, in the exemplary embodiment, clip 566 is positioned within shell member 504 proximate first end 528 of shell member 504 such that floating nut 506 is trapped between second end 530 of shell member 504 and clip 566. Clip 566 is positionable between a first position in which clip 566 fits through aperture 514 and a second position in which clip 566 is retained within shell member 504. Gap 568 facilitates clip 566 moving between the first position and the second position. In the first position, clip 566 is positionable through aperture 514 into the interior cavity of shell member 504. For example, in the first position, clip 566 is deformed such that a width of clip 566 is less than the width of aperture 514. In the second position, clip 566 has a diameter that is larger than a width of aperture 514. Clip 566 is moved from the second position to the first position by pressing clip 566 with an inward radial force. Clip 566 is resilient and returns to the second position when the inward radial force is removed. Clip 566 includes a notch 569 configured to facilitate moving clip 566 between the second position and the first position when clip 566 is positioned within shell member 504.

In addition, in the exemplary embodiment, shell member 504 has a plurality of grooves 570 spaced about central axis 523. Each groove 570 receives a portion of clip 566 when clip 566 is in the first position within shell member 504. Grooves 570 act as engagement features that engage clip 566 and resist axial movement of clip 566 when clip 566 is within shell member 504 in the first position. As a result, clip 566 and shell member 504 resist removal of floating nut 506 when floating nut 506 and clip 566 are positioned within shell member 504. Shell member 504 retains clip 566 therein and clip 566 contacts flange 562 of floating nut 506 to inhibit removal of floating nut 506 through aperture 514. In alternative embodiments, clip 566 engages plate member 502, shell member 504, and/or floating nut 506 in any manner that enables nut plate assembly 500 to operate as described herein. For example, in some embodiments, plate member 502 includes at least one engagement feature that engages clip 566.

Nut plate assembly 500 is assembled substantially similar to nut plate assembly 100 described above. For example, to assemble nut plate assembly 500, bias member 508 is placed into shell member 504. Floating nut 506 is placed into shell member 504 such that bias member 508 seats about shoulder portion 558 of floating nut 506. Clip 566 is positioned within shell member 504 through aperture 514. Clip 566 engages at least one of plate member 502 and shell member 504 to retain floating nut 506 within shell member 504.

Figure 37:
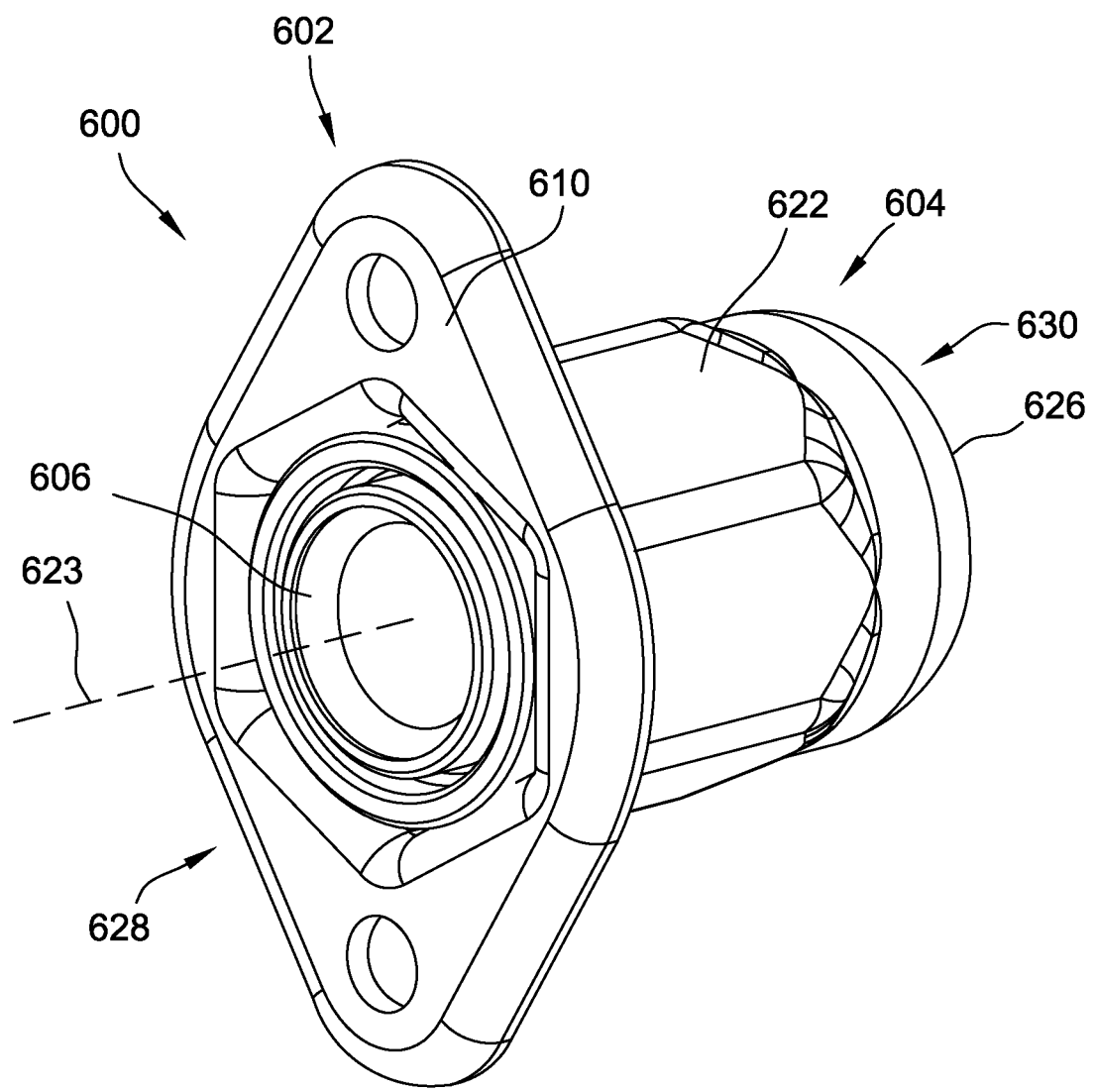
FIG. 37 is a perspective view of another spring-loaded nut plate assembly.
Figure 38:
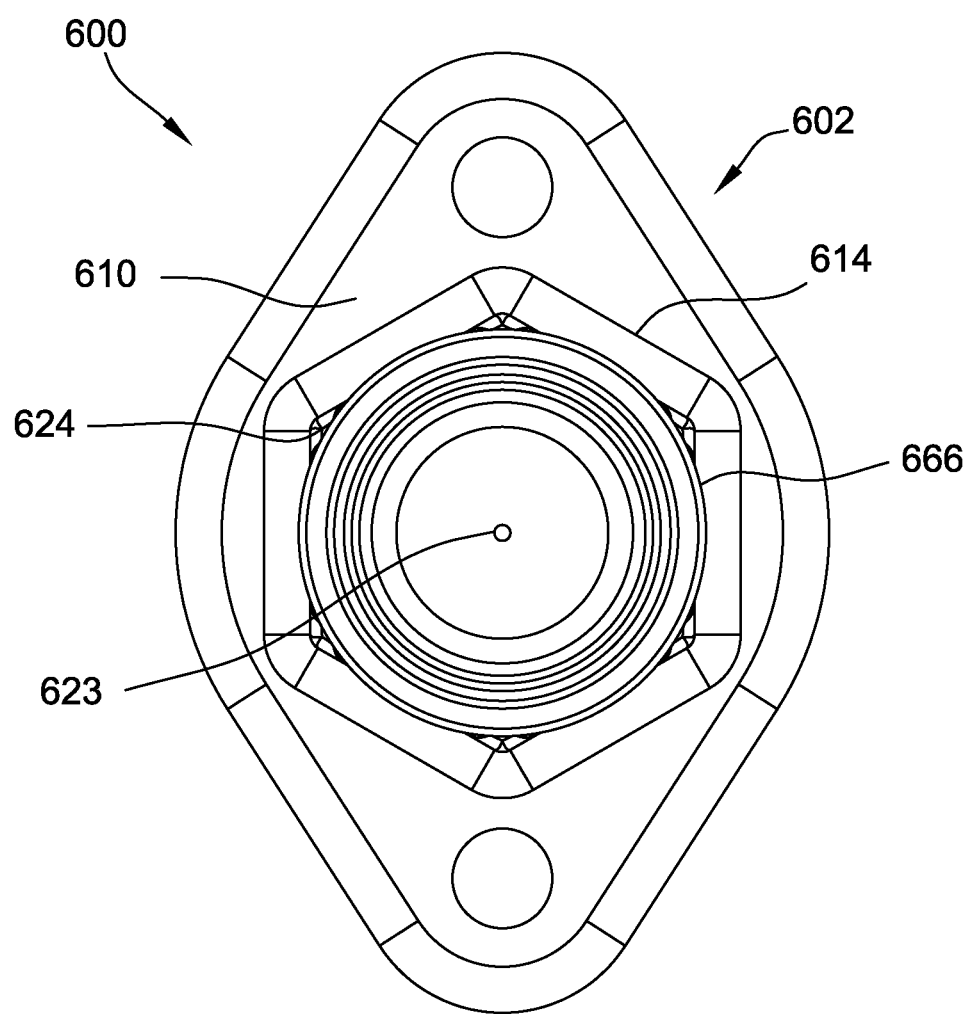
FIG. 38 is an end view of the nut plate assembly shown in FIG. 37.
Figure 39:
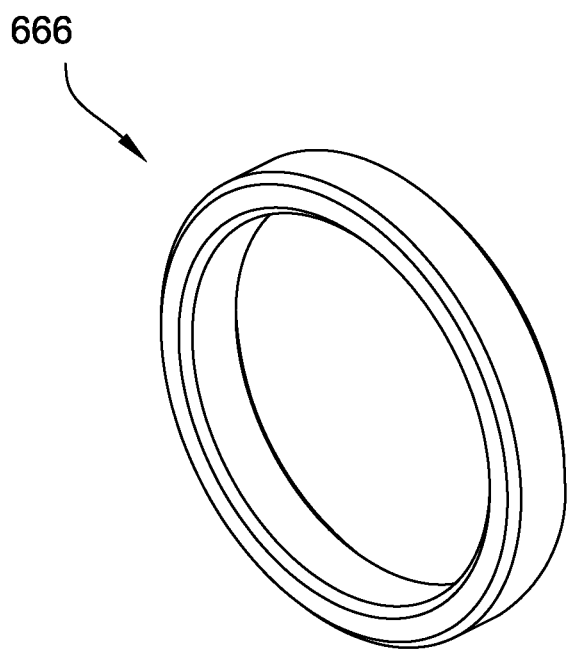
FIG. 39 is a perspective view of a clip for use with the nut plate assembly shown in FIGS. 37 and 38.

FIG. 37 is a perspective view of another spring-loaded nut plate assembly 600. FIG. 38 is an end view of nut plate assembly 600. FIG. 39 is a perspective view of a clip 666 for use with nut plate assembly 600. In the exemplary embodiment, nut plate assembly 600 is similar to nut plate assembly 100 (shown in FIG. 1) and includes a plate member 602, a shell member 604, a floating nut 606, and a bias member (not shown in FIGS. 37-39). Plate member 602 includes a wall portion 610 integrally formed with shell member 604. Wall portion 610 includes an aperture 614 defined therethrough for receiving a fastener (not shown in FIGS. 27-31). In addition, aperture 614 is sized and shaped to allow floating nut 606 to be positioned therethrough. In alternative embodiments, nut plate assembly 600 includes any plate member 602 that enables nut plate assembly 600 to operate as described herein.

In the exemplary embodiment, shell member 604 includes a wall 622 that extends around and along a central axis 623 of nut plate assembly 600. Wall 622 defines a first opening 624 at a first end 628 of shell member 604 and a second opening 626 at a second end 630 of shell member 604. First opening 624 and second opening 626 are generally concentric with each other. At first end 628, shell member 604 is joined to wall portion 610 of plate member 602. At second end 630, wall 622 tapers radially inward to facilitate retaining floating nut 606 within shell member 604. Wall 622 extends continuously from first end 628 to second end 630 and is free of openings other than first opening 624 and second opening 626. Accordingly, shell member 604 and plate member 602 inhibit the entrapment of debris and containments during use of nut plate assembly 600. In alternative embodiments, nut plate assembly 600 includes any shell member 604 that enables nut plate assembly 600 to operate as described herein.

Also, in the exemplary embodiment, floating nut 606 is disposed within shell member 604 and is moveable along a central axis. For example, floating nut 606 is moveable along a central axis of shell member 604 between a first position and a second position. In the first position, floating nut 606 is proximate first end 628. In the second position, floating nut 606 is proximate second end 630. In alternative embodiments, floating nut 606 is moveable in any manner that enables nut plate assembly 600 to operate as described herein.

In addition, in the exemplary embodiment, a cross-sectional shape of shell member 604 is defined by wall 622. The cross-sectional shape of shell member 604 is taken along a plane perpendicular to central axis 623 and is configured to correspond to the cross-sectional shape of floating nut 606. Specifically, in the exemplary embodiment, shell member 604 and floating nut 606 have the same cross-sectional shape. In addition, shell member 604 and floating nut 606 define a gap therebetween that is sized to allow axial movement of floating nut 606 and prevent rotation of floating nut 606. For example, the gap between floating nut 606 and shell member 604 is less than the width of a planar side of floating nut 606. Accordingly, wall 622 of shell member 604 engages floating nut 606 to inhibit rotation of floating nut 606 when floating nut 606 is positioned within shell member 604. In the exemplary embodiment, shell member 604 and floating nut 606 are hexagons. In alternative embodiments, shell member 604 and floating nut 606 are any shapes that enable nut plate assembly 600 to operate as described herein. For example, in some embodiments, shell member 604 and/or floating nut 606 includes, without limitation, a triangle, a rectangle, a trapezoid, a pentagon, a hexagon, a heptagon, an octagon, a nonagon, a decagon, a dodecagon, and a star. In further embodiments, at least one side of shell member 604 and/or floating nut 606 is curved.

In the exemplary embodiment, nut plate assembly 600 includes a clip, more broadly a retention member, 666. Clip 666 is configured to engage shell member 604 and floating nut 606 (shown in FIGS. 32-34) to retain floating nut 606 within shell member 604. In the exemplary embodiment, clip 666 is circular and is arranged to extend around central axis 623 when clip 666 is positioned in shell member 604. In alternative embodiments, nut plate assembly 600 includes any clip 666 that enables nut plate assembly 600 to operate as described herein.

Also, in the exemplary embodiment, clip 666 is positioned within shell member 604 proximate first end 628 of shell member 604 such that floating nut 606 is trapped between second end 630 of shell member 604 and clip 666. Clip 666 has an interference fit within shell member 604. Accordingly, shell member 604 and clip 666 resist axial movement of clip 666 when clip 666 is within shell member 604. As a result, clip 666 and shell member 604 resist removal of floating nut 606 when floating nut 606 and clip 666 are positioned within shell member 604. In alternative embodiments, clip 666 engages plate member 602 and/or shell member 604 in any manner that enables nut plate assembly 600 to operate as described herein.

Nut plate assembly 600 is assembled substantially similar to nut plate assembly 100 described above. For example, to assemble nut plate assembly 600, a bias member is placed into shell member 604. Floating nut 606 is placed into shell member 604 such that the bias member seats about a shoulder portion of floating nut 606. Clip 666 is positioned within shell member 604 and engages at least one of plate member 602 and shell member 604 to retain floating nut 606 within shell member 604.

Figure 40:
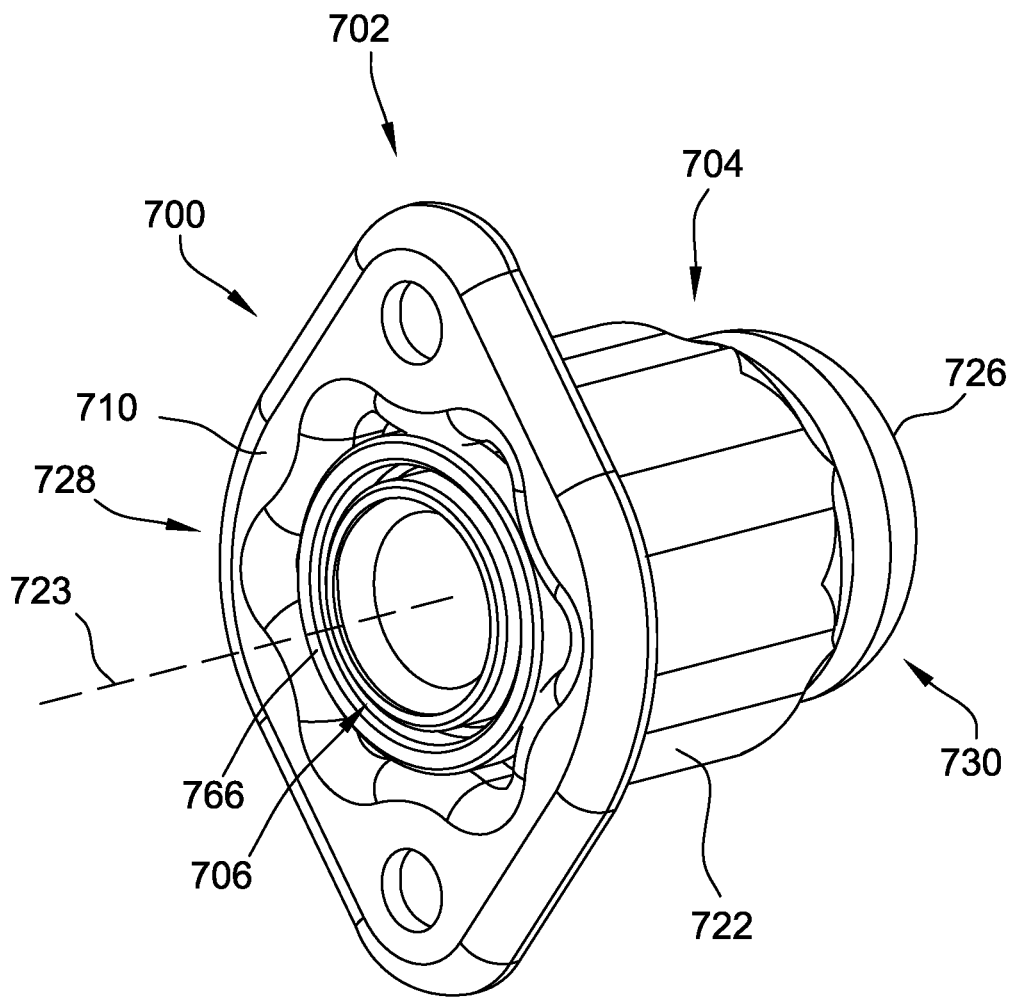
FIG. 40 is a perspective view of another spring-loaded nut plate assembly.
Figure 41:
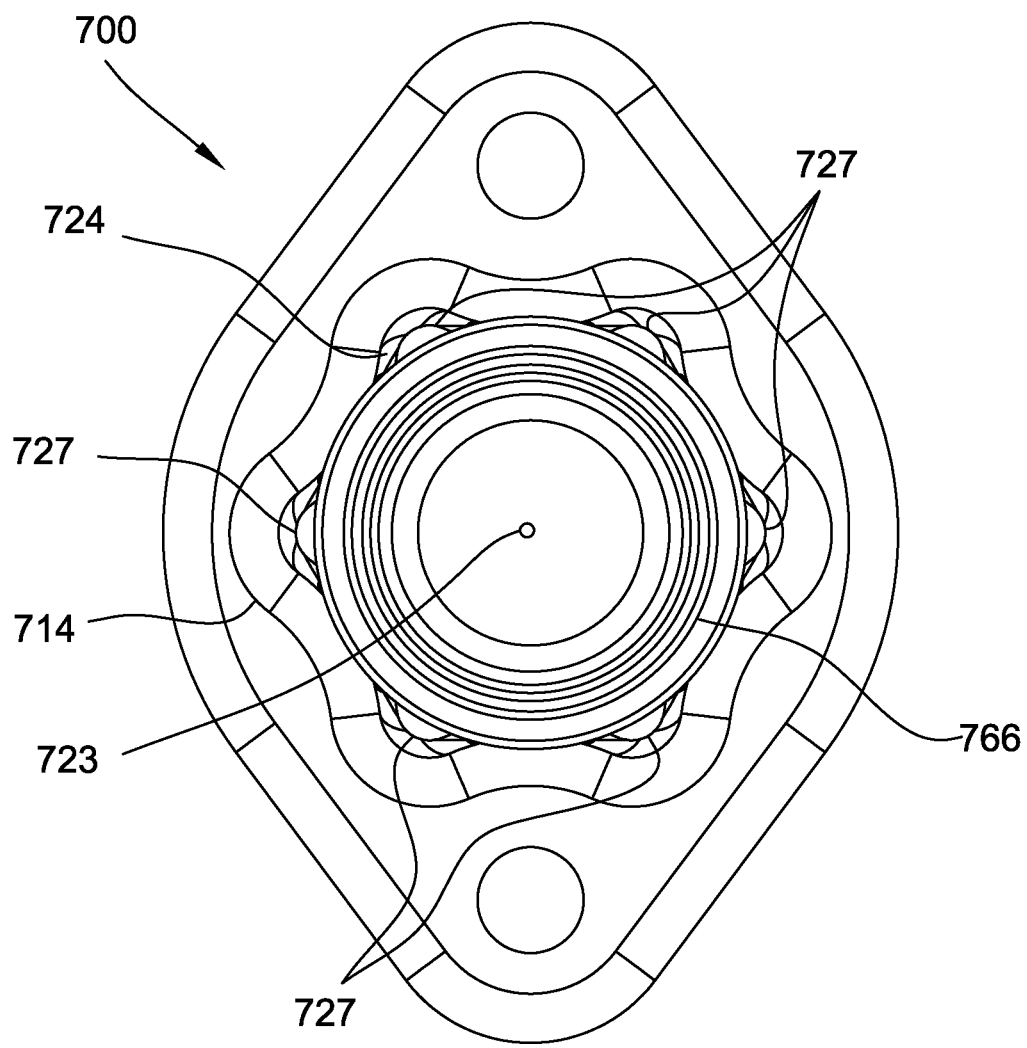
FIG. 41 is an end view of the nut plate assembly shown in FIG. 40.

FIG. 40 is a perspective view of a spring-loaded nut plate assembly 700. FIG. 41 is an end view of nut plate assembly 700. In the exemplary embodiment, nut plate assembly 700 is similar to nut plate assembly 100 (shown in FIG. 1) and includes a plate member 702, a shell member 704, a floating nut 706, and a bias member (not shown in FIGS. 37-39). Plate member 702 includes a wall portion 710 integrally formed with shell member 704. Wall portion 710 includes an aperture 714 defined therethrough for receiving a fastener (not shown in FIGS. 27-31). In addition, aperture 714 is sized and shaped to allow floating nut 706 to be positioned therethrough. In alternative embodiments, nut plate assembly 700 includes any plate member 702 that enables nut plate assembly 700 to operate as described herein.

In the exemplary embodiment, shell member 704 includes a wall 722 that extends around and along a central axis 723 of nut plate assembly 700. Wall 722 defines a first opening 724 at a first end 728 of shell member 704 and a second opening 726 at a second end 730 of shell member 704. First opening 724 and second opening 726 are generally concentric with each other. At first end 728, shell member 704 is joined to wall portion 710 of plate member 702. At second end 730, wall 722 tapers radially inward to facilitate retaining floating nut 706 within shell member 704. Wall 722 extends continuously from first end 728 to second end 730 and is free of openings other than first opening 724 and second opening 726. Accordingly, shell member 704 and plate member 702 inhibit the entrapment of debris and containments during use of nut plate assembly 700. In alternative embodiments, nut plate assembly 700 includes any shell member 704 that enables nut plate assembly 700 to operate as described herein.

Also, in the exemplary embodiment, floating nut 706 is disposed within shell member 704 and is moveable along a central axis. For example, floating nut 706 is moveable along a central axis of shell member 704 between a first position and a second position. In the first position, floating nut 706 is proximate first end 728. In the second position, floating nut 706 is proximate second end 730. In alternative embodiments, floating nut 706 is moveable in any manner that enables nut plate assembly 700 to operate as described herein.

In addition, in the exemplary embodiment, a cross-sectional shape of shell member 704 is defined by wall 722. The cross-sectional shape of shell member 704 is taken along a plane perpendicular to central axis 723 and is configured to correspond to the cross-sectional shape of floating nut 706. Floating nut 706 includes a plurality of projections 725 that are received in cavities 727 in shell member 704. Accordingly, wall 722 of shell member 704 engages floating nut 706 to inhibit rotation of floating nut 706 when floating nut 706 is positioned within shell member 704. In alternative embodiments, shell member 704 and floating nut 706 are any shapes that enable nut plate assembly 700 to operate as described herein. For example, in some embodiments, shell member 704 and/or floating nut 706 includes, without limitation, a triangle, a rectangle, a trapezoid, a pentagon, a hexagon, a heptagon, an octagon, a nonagon, a decagon, a dodecagon, and a star. In further embodiments, at least one side of shell member 704 and/or floating nut 706 is curved.

In the exemplary embodiment, nut plate assembly 700 includes clip, more broadly a retention member, 766. Clip 766 is configured to engage shell member 704 and floating nut 706 to retain floating nut 706 within shell member 704. In alternative embodiments, nut plate assembly 700 includes any clip 766 that enables nut plate assembly 700 to operate as described herein.

Also, in the exemplary embodiment, clip 766 is positioned within shell member 704 proximate first end 728 of shell member 704 such that floating nut 706 is trapped between second end 730 of shell member 704 and clip 766. Accordingly, shell member 704 and clip 766 resist axial movement of clip 766 when clip 766 is within shell member 704 and in the second position. As a result, clip 766 and shell member 704 resist removal of floating nut 706 when floating nut 706 and clip 766 are positioned within shell member 704. In alternative embodiments, clip 766 engages plate member 702 and/or shell member 704 in any manner that enables nut plate assembly 700 to operate as described herein.

Figure 42:
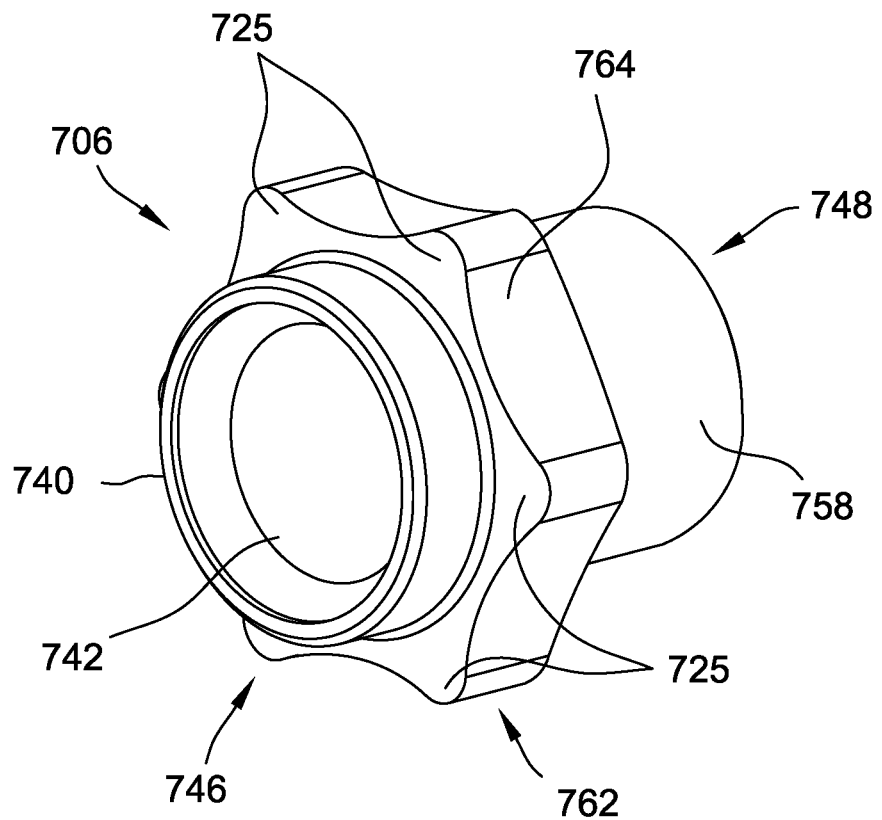
FIG. 42 is a perspective view of a floating nut for use with the nut plate assembly shown in FIGS. 40 and 41.
Figure 43:
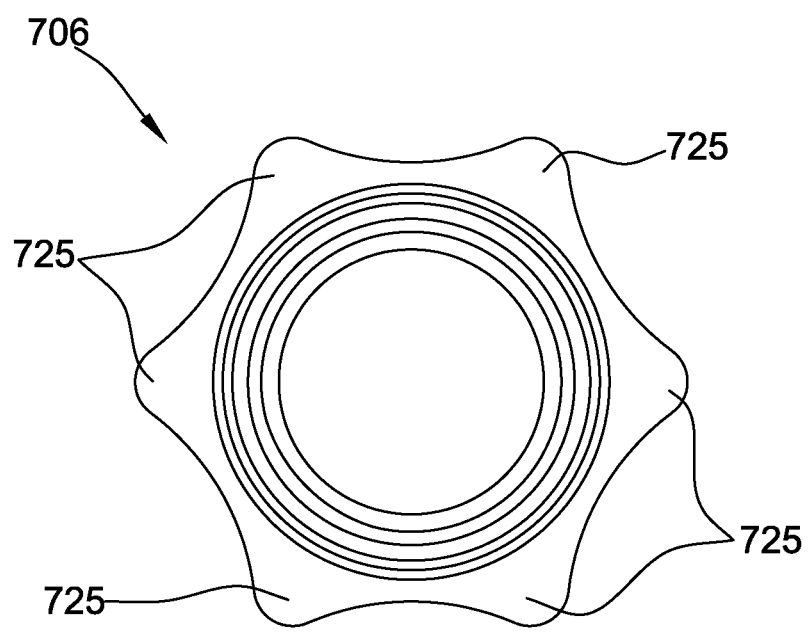
FIG. 43 is an end view of the floating nut shown in FIG. 42.

FIG. 42 is a perspective view of floating nut 706 for use with nut plate assembly 700. FIG. 43 is a front view of floating nut 706. In the exemplary embodiment, floating nut 706 has a body 740 that defines a bore 742 therethrough. Bore 742 extends from a first end 746 of floating nut 706 to a second end 748 of floating nut 706. Floating nut 706 includes a shoulder portion 758 and a flange 762. Shoulder portion 758 extends from second end 748 axially along body 740 to flange 762. Shoulder portion 758 enables a bias member (not shown in FIGS. 37-39) to apply an axial force to body 740 to urge body 740 toward plate member 702. Flange 762 extends about body 740 proximate first end 746 of floating nut 706. Flange 762 engages shell member 704 to inhibit rotation of floating nut 706 about central axis 723 when floating nut 706 is positioned within shell member 704. Specifically, an outer surface 764 of flange 762 contacts an inner surface of shell member 704. Outer surface 764 includes a plurality of sides that define the cross-sectional shape of flange 762 and floating nut 706. As described further above, the cross-sectional shape of floating nut 706 corresponds to the cross-sectional shape of shell member 704 (shown in FIGS. 27-30). In the exemplary embodiment, outer surface 764 of flange 762 is defined by six projections 725 forming a star cross-sectional shape. As a result, the shape of flange 762 provides increased resistance to torque forces on floating nut 706 in comparison to other flanges such as flange 562 (shown in FIG. 33). In alternative embodiments, floating nut 706 includes any flange 762 that enables floating nut 706 to operate as described herein.

Nut plate assembly 700 is assembled substantially similar to nut plate assembly 100 described above. For example, to assemble nut plate assembly 700, a bias member is placed into shell member 704. Floating nut 706 is placed into shell member 704 such that the bias member seats about shoulder portion 758 of floating nut 706. Clip 766 is positioned within shell member 704 and engages at least one of plate member 702 and shell member 704 to retain floating nut 706 within shell member 704.

The components as described herein provide spring-loaded nut plate assemblies. For example, as described in the embodiments herein, a floating nut of the nut plate assemblies is biased by a bias member, which enables the use of captive panel screws. This facilitates ease of assembly and disassembly of a panel to an underlying structure. In addition, the spring-loaded nut plate assemblies facilitate varying length captive panel fasteners. The bias member facilitates one of pulling the structure components together or pushing them apart during assembly or removal of the panel structure. In addition, the bias member facilitates preventing damage to the internal threads of the floating nut during installation of the fastener.

Exemplary embodiments of spring-loaded nut plate assemblies are described above. The systems and methods are not limited to the specific embodiments described herein, but rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A nut plate assembly comprising:
    a plate member comprising an aperture defined therethrough;
    a shell member having a first end joined to said plate member and a second end opposite said first end;
    a bias member disposed within said shell member;
    a nut comprising a shoulder portion configured to receive a portion of said bias member, said nut disposed within said shell member and moveable between a first position proximate said shell member first end and a second position proximate said shell member second end, wherein said bias member is configured to bias said nut toward one of said first position and said second position; and
    a retention member comprising a clip, said clip configured to engage said shell member and said nut and configured to retain said nut within said shell member.

2. A nut plate assembly in accordance with claim 1, wherein said shell member defines a first opening at said first end and a second opening at said second end, wherein said shell member is substantially free of openings other than the first opening and the second opening.

3. A nut plate assembly in accordance with claim 2, wherein said shell member comprises a wall extending about an axis from said first end to said second end, said wall configured to engage said nut and inhibit rotation of said nut about the axis.

4. A nut plate assembly in accordance with claim 3, wherein said nut includes a flange configured to engage said wall.

5. A nut plate assembly in accordance with claim 4, wherein said shell member has a cross-sectional shape that corresponds to a cross-sectional shape of said flange.

6. A nut plate assembly in accordance with claim 4, wherein said flange includes a plurality of planar sides extending about a circumference of said flange, said plurality of planar sides configured to engage said wall.

7. A nut plate assembly in accordance with claim 1, wherein said shell member defines at least one groove configured to receive a portion of said clip.

8. A nut plate assembly in accordance with claim 7, wherein said clip is positionable between a first position in which said clip fits through the aperture and a second position in which said clip is larger than the aperture, said clip engaging said shell member and said nut when said clip is positioned in the second position within said shell member.

9. A nut plate assembly in accordance with claim 1, wherein said plate member and said shell member are integrally formed as a single piece.

10. A nut plate assembly in accordance with claim 1 further comprising a fastener extending through said plate member and said nut, wherein said fastener is threadably engageable with said nut.

11. A nut plate assembly in accordance with claim 1, wherein said nut further comprises a body and a flange, said flange extending about said body and configured to engage said shell member.

12. A nut plate assembly in accordance with claim 11, wherein the shape of said flange is at least one of a triangle, a rectangle, a trapezoid, a pentagon, a hexagon, a heptagon, an octagon, a nonagon, a decagon, a dodecagon, and a star.

13. A fastener assembly comprising:
a nut plate assembly adapted for mounting to a mounting structure, said nut plate assembly comprising:
- a plate member comprising an aperture defined therethrough;
- a shell member having a first end joined to said plate member and a second end opposite said first end;
- a bias member disposed within said shell member;
- a nut comprising a shoulder portion configured to receive a portion of said bias member, said nut disposed within said shell member and moveable between a first position proximate said shell member first end and a second position proximate said shell member second end, wherein said bias member is configured to bias said nut toward one of said first position and said second position; and
- a retention member comprising a clip, said clip configured to engage said shell member and said nut and configured to retain said nut within said shell member; and a fastener configured to mount in an aperture formed in a panel member, said fastener threadably engageable with said nut for coupling the panel member to the mounting structure.

14. A fastener assembly in accordance with claim 13, wherein said fastener comprises a locking mechanism for retaining said fastener in the aperture.

15. A fastener assembly in accordance with claim 13, wherein said fastener comprises one of the following: a hexagonal head, a spline head, a flat head, a socket cap head, and a pan head.

16. A fastener assembly in accordance with claim 13, wherein said fastener is a locking fastener comprising at least one component configured to lock said fastener against rotation relative to the panel member.

17. A fastener assembly in accordance with claim 13, wherein said plate member and said shell member are integrally formed as a single piece.

18. A nut plate assembly in accordance with claim 13, wherein said shell member defines a first opening at said first end and a second opening at said second end, wherein said shell member is substantially free of openings other than the first opening and the second opening.

19. A method of assembling a nut plate assembly, said method comprising:
- positioning a bias member within a shell member, the shell member having a first end joined to a plate member and a second end opposite said first end, the plate member including an aperture defined therethrough;
- positioning a nut within the shell member, the nut including a shoulder portion configured to receive a portion of the bias member, the nut moveable between a first position proximate the shell member first end and a second position proximate the shell member second end, wherein the bias member is configured to bias the nut toward one of the first position and the second position; and
- coupling a retention member including a clip to the shell member to retain the nut within the shell member, the clip engaging the shell member and the nut.

20. A method in accordance with claim 19 further comprising positioning the retention member within the shell member, wherein the retention member is positionable between a first position in which the retention member fits through the aperture and a second position in which the retention member inhibits removal of the nut from the shell member.

* * * * *